US010698271B2

(12) United States Patent
Yeh et al.

(10) Patent No.: US 10,698,271 B2
(45) Date of Patent: Jun. 30, 2020

(54) LIQUID CRYSTAL DISPLAY PANEL

(71) Applicant: AU Optronics Corp., Hsin-Chu (TW)

(72) Inventors: Chao-Wei Yeh, Hsin-Chu (TW);
Chien-Huang Liao, Hsin-Chu (TW);
Wen-Hao Hsu, Hsin-Chu (TW);
Tien-Lun Ting, Hsin-Chu (TW);
Chao-Yuan Chen, Hsin-Chu (TW);
Jenn-Jia Su, Hsin-Chu (TW)

(73) Assignee: AU OPTRONICS CORPORATION, Hsin-Chu (TW)

( * ) Notice: Subject to any disclaimer, the term of this patent is extended or adjusted under 35 U.S.C. 154(b) by 89 days.

(21) Appl. No.: 16/113,825

(22) Filed: Aug. 27, 2018

(65) Prior Publication Data

US 2018/0364528 A1 Dec. 20, 2018

Related U.S. Application Data

(62) Division of application No. 14/716,885, filed on May 20, 2015, now Pat. No. 10,082,711, which is a division of application No. 13/189,556, filed on Jul. 24, 2011, now Pat. No. 9,081,217.

(30) Foreign Application Priority Data

Sep. 29, 2010 (TW) .............................. 99132996 A
Mar. 4, 2011 (TW) ............................ 100107302 A

(51) Int. Cl.
| | |
|---|---|
| G02F 1/1343 | (2006.01) |
| G02F 1/1337 | (2006.01) |
| G02F 1/13 | (2006.01) |
| G02F 1/1362 | (2006.01) |
| G02F 1/1368 | (2006.01) |

(52) U.S. Cl.
CPC ...... *G02F 1/134336* (2013.01); *G02F 1/1323* (2013.01); *G02F 1/1368* (2013.01); *G02F 1/133753* (2013.01); *G02F 1/134363* (2013.01); *G02F 1/136286* (2013.01); *G02F 2001/134345* (2013.01); *G09G 2320/028* (2013.01)

(58) Field of Classification Search
CPC ................................................. G09G 2320/028
See application file for complete search history.

(56) References Cited

U.S. PATENT DOCUMENTS

| | | | | |
|---|---|---|---|---|
| 2009/0284673 A1* | 11/2009 | Kim | .................. | G02F 1/134309 349/33 |
| 2010/0039418 A1* | 2/2010 | Chen | .................... | G09G 3/3611 345/208 |
| 2010/0157185 A1* | 6/2010 | Kim | ..................... | G02F 1/1362 349/38 |

\* cited by examiner

*Primary Examiner* — Alexander P Gross
(74) *Attorney, Agent, or Firm* — Tim Tingkang Xia, Esq.; Locke Lord LLP

(57) ABSTRACT

A liquid crystal display panel includes a first substrate, a second substrate, a liquid crystal layer, a plurality of first regions and a plurality of second regions. The first regions and the second regions are formed on the first substrate and the second substrate. In a narrow viewing mode, the luminous flux of the first regions along a first viewing direction is different from that of the first regions along a second viewing direction opposite to the first viewing direction, and the luminous flux of the second regions along the first viewing direction is substantially different from that of the first regions along the first viewing direction.

6 Claims, 19 Drawing Sheets

LIQUID CRYSTAL DISPLAY PANEL

CROSS-REFERENCE TO RELATED APPLICATIONS

This application is a divisional application of U.S. application Ser. No. 14/716,885, filed May 20, 2015, which is a divisional application of U.S. non-provisional application Ser. No. 13/189,556 filed Jul. 24, 2011, now issued as U.S. Pat. No. 9,081,217, which itself claims priority to and the benefit of, pursuant to 35 U.S.C. § 119(a), patent application Serial No. TW 100107302 filed in Taiwan on Mar. 4, 2011, and patent application Serial No. TW 099132996 filed in Taiwan on Sep. 29, 2010. The contents of the above applications are incorporated herein in their entireties by reference.

TECHNICAL FIELD

The present invention relates to a liquid crystal display panel, and more particularly, to a liquid crystal display panel able to provide anti-peeping effect.

BACKGROUND

Generally, a display device is provided with wide viewing angle such that more users can see the images displayed by the display device. However, under some circumstances, such as when reading confidential data or when inputting password, the wide viewing angle display effect makes it possible for other people around the display device to see the confidential data, which increases the risk of data leak. Therefore, to fulfill the two different requirements of providing images for more users at the same time and reading confidential data in public place wherever necessary, a display device that can be switched between a wide viewing angle mode and a narrow viewing angle mode has been expected as a mainstream product in display device market.

The conventional anti-peeping mechanisms for display device can be mainly classified as the following approaches:
1. Adding Additional Anti-Peeping Film to the Surface of Substrate of the Display Device:

The anti-peeping film can restrain the brightness of wider viewing angle, and thus people aside the display device cannot clearly read the displayed image. The anti-peeping film is a commonly-used material, though; the additional anti-peeping film will adversely affects the optical property and display quality of the display device when displaying images for the user in front of the display device. Also, the user has to manually switch the anti-peeping film, which causes inconvenience.
2. Backlight Source Control:

The switching between wide viewing mode and narrow viewing mode can be achieved by using a backlight source with high collimation accompanied with a diffusion sheet able to be controlled by voltage e.g. a polymer dispersion liquid crystal (PDLC) film. For example, when no voltage is applied, the diffusion sheet will diffuse the collimated backlight, so that the backlight can emit in the side viewing direction. Thus, the wide viewing mode can be provided. When a voltage is applied, the diffusion sheet will not diffuse the collimated backlight. Thus, the narrow viewing mode can be provided. To be exact, this approach adjust the brightness of the backlight emitting in the side viewing direction by controlling the emitting angle of the backlight, so that people cannot see the display image in the side viewing direction. In practical application, it is difficult to control the light route, and thus a perfect collimated backlight cannot be obtained. In such a case, the brightness of the backlight emitting in the side viewing direction may be reduced to a certain extent, but the brightness of the backlight emitting in the side viewing direction is yet not ignorable. As a result, the anti-peeping effect is not satisfactory.
3. Adding a Viewing Angle Control Module:

The switching between wide viewing mode and narrow viewing mode can be achieved by adding an additional viewing angle control module to the display device (panel). In the wide viewing mode, the viewing angle control module does not cause any interference or damage on the displayed image; in the narrow viewing mode, the viewing angle control module can restrain the brightness in the side viewing direction, such that people cannot clearly read the display image in the side viewing direction. However, this approach requires two modules including the display module and the additional viewing angle control module, and thus the overall weight and thickness is doubled. Also, the cost is highly increased.

It can be seen that the aforementioned conventional anti-peeping approaches have to sacrifice some of the original characteristics such as display quality, optical property, thickness and weight for providing the anti-peeping effect, and thus need to be improved.

SUMMARY OF THE INVENTION

It is therefore one of the objectives of the present invention to provide a liquid crystal display panel to provide effective anti-peeping effect without increasing cost and process complexity.

According to one embodiment, a liquid crystal display panel is provided. The liquid crystal display panel includes a first substrate, a second substrate, a liquid crystal layer, a plurality of first regions, a plurality of second regions, a plurality of first pixel electrodes and a plurality of second pixel electrodes. The second substrate is disposed oppositely to the first substrate. The liquid crystal layer is disposed between the first substrate and the second substrate. The first regions and the second regions are formed on the first substrate and the second substrate. Each of the first regions has a first main region and a first sub region, and each of the second regions has a second main region and a second sub region. The first pixel electrodes and the second pixel electrodes are disposed on the first substrate, wherein each of the first pixel electrodes is disposed in each of the first regions, respectively, each of the second pixel electrodes is disposed in each of the second regions, respectively. The first pixel electrode and the second pixel electrode have different electrode patterns, each of the first pixel electrodes comprises a first main pixel electrode and a first sub pixel electrode, each of the second pixel electrodes comprises a second main pixel electrode and a second sub pixel electrode, the first main pixel electrode is disposed in the first main region, the first sub pixel electrode is disposed in the first sub region, the second main pixel electrode is disposed in the second main region, and the second sub pixel electrode is disposed in the second sub region. The first main pixel electrode and the second main pixel electrode are mirror symmetric with respect to a symmetry axis, and the first sub pixel electrode and the second sub pixel electrode are mirror symmetric with respect to the symmetry axis.

According to another embodiment, a liquid crystal display panel is provided. The liquid crystal display panel includes a first substrate, a second substrate, a liquid crystal layer, a plurality of first regions, a plurality of second regions, a plurality of third regions, a plurality of fourth regions and a plurality of pixel electrodes. The second substrate is disposed oppositely to the first substrate. The liquid crystal layer is disposed between the first substrate and the second substrate. The first regions, the second regions, the third regions and the fourth regions are formed on the first substrate and the second substrate. The pixel electrodes disposed are on the first substrate, wherein the pixel electrodes disposed in the first region, the second region, the third region and the fourth region have different pixel electrode patterns, and the pixel electrodes disposed in the first region, the second region, the third region and the fourth region are electrically connected to different pixel switching devices. The liquid crystal display panel comprises a first domain, a second domain, a third domain and a fourth domain, the first regions are disposed in the first domain, the second regions are disposed in the second domain, the third regions are disposed in the third domain, and the fourth regions are disposed in the fourth domain. In a narrow viewing mode, the luminous flux of the first regions along a first viewing direction is different from that of the first regions along a second viewing direction, a third viewing direction and a fourth viewing direction different from the first viewing direction, the luminous flux of the second regions along the second viewing direction is different from that of the second regions along the first viewing direction, the third viewing direction and the fourth viewing direction, the luminous flux of the third regions along the third viewing direction is different from that of the third regions along the first viewing direction, the second viewing direction and the fourth viewing direction, the luminous flux of the fourth regions along the fourth viewing direction is different from that of the fourth regions along the first viewing direction, the second viewing direction and the third viewing direction, the luminous flux of the first regions along the first viewing direction is different from those of the second regions, the third regions and the fourth regions along the first viewing direction, the luminous flux of the second regions along the second viewing direction is different from those of the first regions, the third regions and the fourth regions along the second viewing direction, the luminous flux of the third regions along the third viewing direction is different from those of the first regions, the second regions and the fourth regions along the third viewing direction, and the luminous flux of the fourth regions along the fourth viewing direction is different from those of the first regions, the second regions and the third regions along the fourth viewing direction.

According to another embodiment, a liquid crystal display panel is provided. The liquid crystal display panel includes a first substrate, a second substrate, a liquid crystal layer, a plurality of first regions, a plurality of second regions, a first domain, a second domain, a plurality of first pixel electrodes and a plurality of second pixel electrodes. The second substrate is disposed oppositely to the first substrate. The liquid crystal layer is disposed between the first substrate and the second substrate. The first regions and the second regions are formed on the first substrate and the second substrate. Each of the first regions has a first main region and a first sub region, and each of the second regions has a second main region and a second sub region. The first pixel electrodes and the second pixel electrodes are disposed on the first substrate. Each of the first pixel electrodes comprises a first main pixel electrode and a first sub pixel electrode, the first main pixel electrode is disposed in the first main region, and the first sub pixel electrode is disposed in the first sub region. Each of the second pixel electrodes comprises a second main pixel electrode and a second sub pixel electrode, the second main pixel electrode is disposed in the second main region, and the second sub pixel electrode is disposed in the second sub region. Each of the first pixel electrodes is disposed in each of the first regions, respectively, and each of the second pixel electrodes is disposed in each of the second regions, respectively. The first pixel electrode and the second pixel electrode have different electrode patterns, the first domain includes a plurality of first regions disposed immediately adjoining to each other, and the second domain includes a plurality of second regions disposed immediately adjoining to each other.

According to still another embodiment, a liquid crystal display panel is provided. The liquid crystal display panel includes a first substrate, a second substrate, a liquid crystal layer, a plurality of first regions, a plurality of second regions, a first domain, a second domain, a plurality of first pixel electrodes and a plurality of second pixel electrodes. The second substrate is disposed oppositely to the first substrate. The liquid crystal layer is disposed between the first substrate and the second substrate. The first regions and the second regions are formed on the first substrate and the second substrate, wherein each of the first regions has a first main region and a first sub region, and each of the second regions has a second main region and a second sub region. The first pixel electrodes are disposed on the first substrate, wherein each of the first pixel electrodes comprises a first main pixel electrode and a first sub pixel electrode, the first main pixel electrode is disposed in the first main region, and the first sub pixel electrode is disposed in the first sub region. The second pixel electrodes are disposed on the first substrate, wherein each of the second pixel electrodes comprises a second main pixel electrode and a second sub pixel electrode, the second main pixel electrode is disposed in the second main region, the second sub pixel electrode is disposed in the second sub region, each of the first pixel electrodes is disposed in each of the first regions, respectively, each of the second pixel electrodes is disposed in each of the second regions, respectively, the first pixel electrode and the second pixel electrode have different electrode patterns, the first domain includes a plurality of first regions disposed immediately adjoining to each other, and the second domain includes a plurality of second regions disposed immediately adjoining to each other. Each of the first main pixel electrodes consists of a first trunk electrode, a second trunk electrode and a plurality of first branches, the first trunk electrode and the second trunk electrode of each of the first main pixel electrodes are electrically connected to each other and substantially arranged perpendicularly to form an L-shaped structure, the first branches of each of the first main pixel electrodes are electrically connected to one of the first trunk electrode and the second trunk electrode, the first branches of each of the first main pixel electrodes are substantially arranged in parallel, each of the second main pixel electrodes consists of a first trunk electrode, a second trunk electrode and a plurality of first branches, the first trunk electrode and the second trunk electrode of each of the second main pixel electrodes are electrically connected to each other and substantially arranged perpendicularly to form an L-shaped structure, the first branches of each of the second main pixel electrodes are electrically connected to one of the first trunk electrode and the second trunk electrode, the first branches of each of the second main pixel electrodes are substantially arranged in parallel, and the first branches of each of the first main pixel electrodes and the first branches of each of the second main pixel electrodes are arranged along different directions. Each of the first sub pixel electrodes consists of a first trunk electrode, a second trunk electrode, a third trunk electrode, a plurality of first branches, a plurality of second branches and a plurality of third branches, the first trunk electrode and the second trunk electrode of each of the first sub pixel electrodes are electrically connected to each other and substantially arranged perpendicularly to form a T-shaped structure, the second trunk electrode and the third trunk electrode of each of the first sub pixel electrodes are electrically connected to each other and substantially arranged perpendicularly to form an L-shaped structure, the first branches, the second branches and the third branches of each of the first sub pixel electrodes are electrically connected to one of the first trunk electrode, the second trunk electrode and the third trunk electrode, the first branches of each of the first sub pixel electrodes are substantially arranged in parallel, the second branches of each of the first sub pixel electrodes are substantially arranged in parallel, the third branches of each of the first sub pixel electrodes are substantially arranged in parallel, the first branches, the second branches and the third branches of each of the first sub pixel electrodes are arranged along different directions, each of the second sub pixel electrode consists of a first trunk electrode, a second trunk electrode, a third trunk electrode, a plurality of first branches, a plurality of second branches and a plurality of third branches, the first trunk electrode and the second trunk electrode of each of the second sub pixel electrodes are electrically connected to each other and substantially arranged perpendicularly to form a T-shaped structure, the second trunk electrode and the third trunk electrode of each of the second sub pixel electrodes are electrically connected to each other and substantially arranged perpendicularly to form an L-shaped structure, the first branches, the second branches and the third branches of each of the second sub pixel electrodes are electrically connected to one of the first trunk electrode, the second trunk electrode and the third trunk electrode, the first branches of each of the second sub pixel electrodes are substantially arranged in parallel, the second branches of each of the second sub pixel electrodes are substantially arranged in parallel, the third branches of each of the second sub pixel electrodes are substantially arranged in parallel, and the first branches, the second branches and the third branches of each of the second sub pixel electrodes are arranged along different directions.

The liquid crystal display panel of the present invention can provide excellent anti-peeping effect by modifying the pattern design of pixel electrode without changing or adding manufacturing process, and the cost and process complexity are not increased.

These and other objectives of the present invention will no doubt become obvious to those of ordinary skill in the art after reading the following detailed description of the preferred embodiment that is illustrated in the various figures and drawings.

DETAILED DESCRIPTION OF THE DISCLOSURE

To provide a better understanding of the present invention to the skilled users in the technology of the present invention, preferred embodiments will be detailed as follows. The preferred embodiments of the present invention are illustrated in the accompanying drawings with numbered elements to elaborate the contents and effects to be achieved.

Figure 1A:
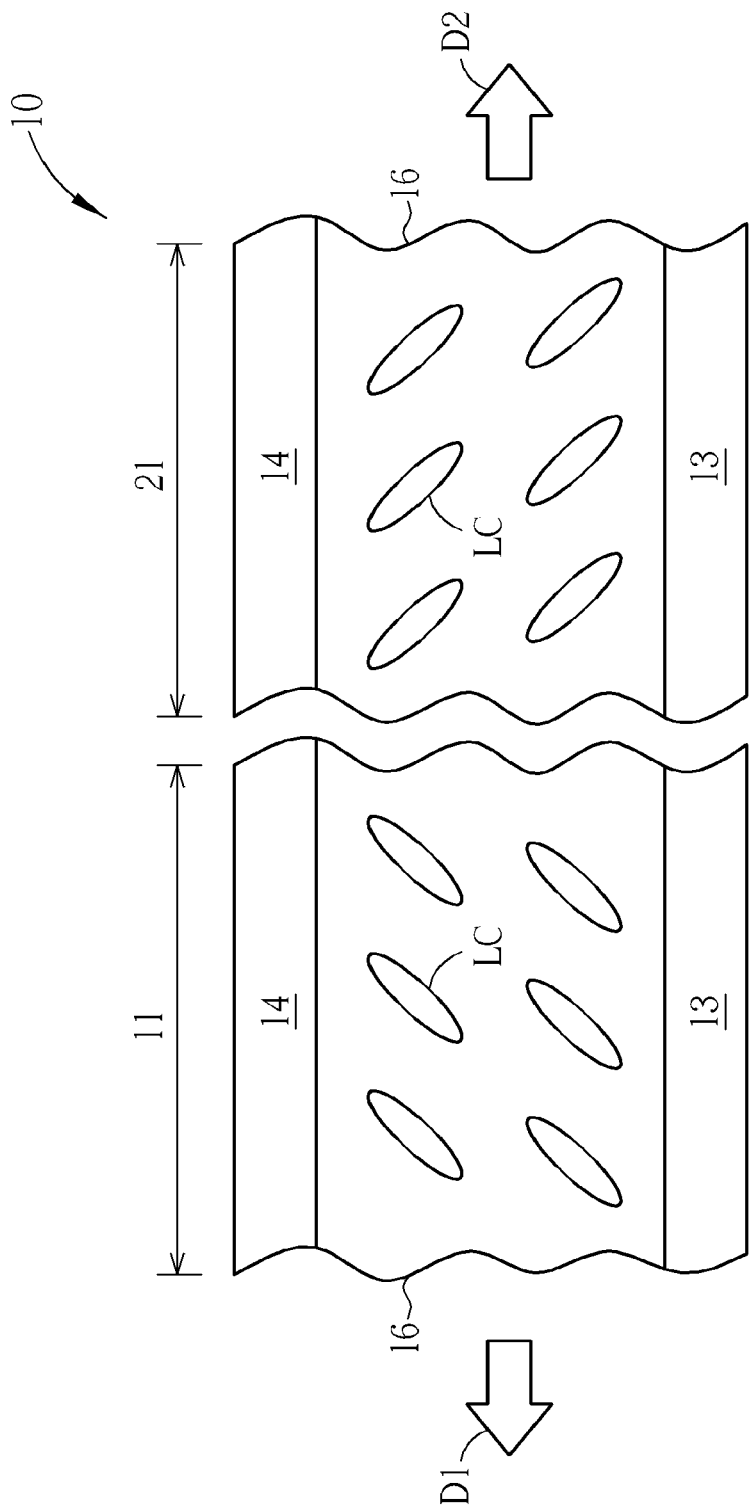
FIG. 1A is a schematic diagram illustrating a liquid crystal display panel according to a preferred embodiment of the present invention.
Figure 1B:
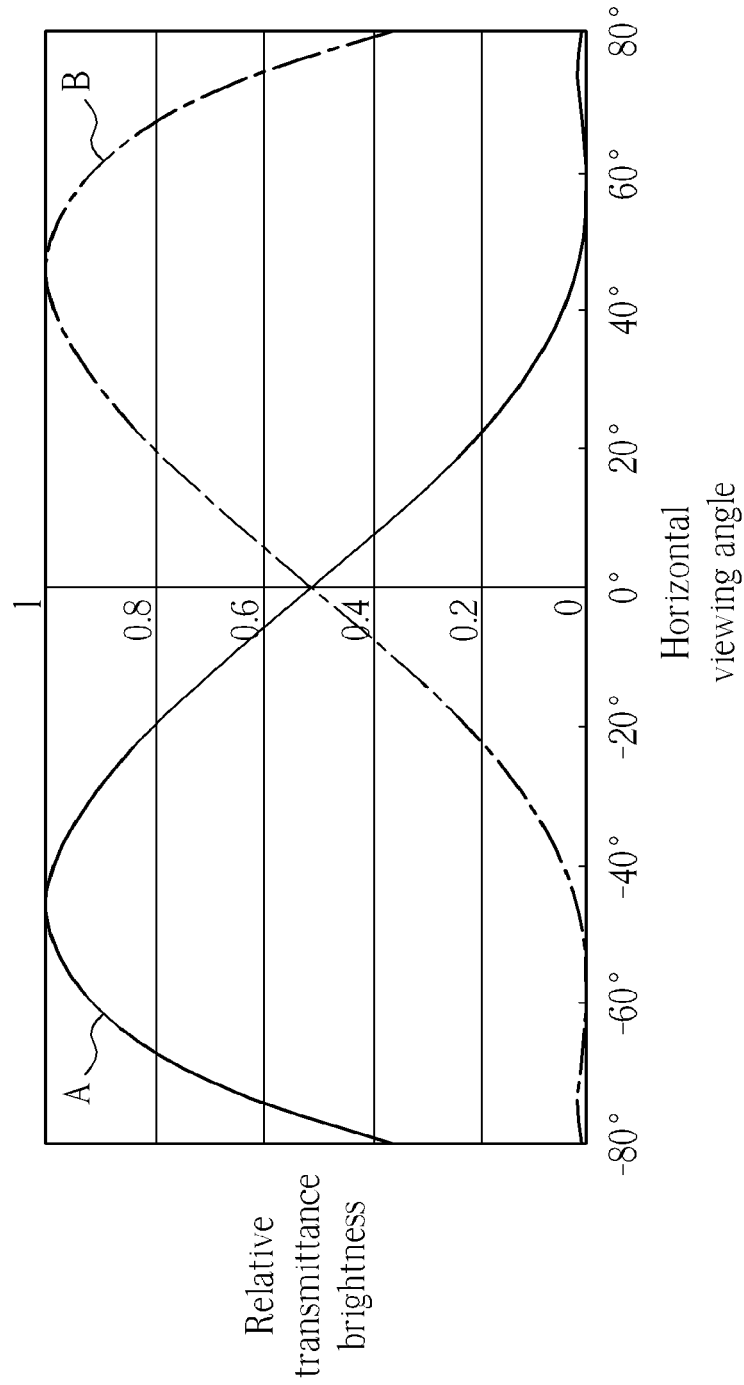
FIG. 1B is a schematic diagram illustrating a relation between relative transmittance brightness and a horizontal viewing angle of a first main region and a second main region of the liquid crystal display panel of FIG. 1A.

Please refer to FIG. 1A and FIG. 1B. FIG. 1A is a schematic diagram illustrating a liquid crystal display panel according to a preferred embodiment of the present invention, and FIG. 1B is a schematic diagram illustrating a relation between relative transmittance brightness and a horizontal viewing angle of a first main region and a second main region of the liquid crystal display panel of FIG. 1A. As shown in FIG. 1A, the liquid crystal display panel 10 of the present embodiment includes a first substrate 13, a second substrate 14, and a liquid crystal layer 16. The first substrate 13 and the second substrate 14 are disposed oppositely. The liquid crystal layer 16, disposed between the first substrate 13 and the second substrate 14, includes a plurality of liquid crystal molecules LC. The liquid crystal display panel 10 includes a plurality of first regions (or namely first view angle region) and a plurality of second regions (or namely second view angle region) formed on the first substrate 13 and the second substrate 14. The first region may be divided into a first main region (or namely first main view angle region) 11 and a first sub region (or namely, first sub view angle region, not shown), and the second region may be divided into a second main region (or namely second main view angle region) 21 and a second sub region ((or namely second sub view angle region, not shown). For the sake of elaborating the viewing angle characteristic when the liquid crystal molecules LC are tilted in different angle, FIG. 1A only shows the first main region 11 and the second main region 21. As shown in FIG. 1B, curve A shows the brightness of the first main region 11 when viewing in different viewing angle in the horizontal direction, while curve B shows the brightness of the second main region 21 when viewing indifferent viewing angle in the horizontal direction. When viewing the liquid crystal display panel 10 in a front view direction, the first main region 11 and the second main region 21 have substantially the same brightness. When viewing the liquid crystal display panel 10 in a side view direction, the luminous flux of the first main region 11 is substantially different from the luminous flux of the second main region 21. Here, viewing in the front view direction means the viewing direction of the viewer is approximately perpendicular to the surface of the liquid crystal display panel 10, while viewing in the side view direction means the viewing direction of the viewer and the surface of the liquid crystal display panel 10 have an included angle approximately less than 80 degrees. It is noted that a non-absolute value of the viewing angle is used to measure the viewing angle when comparing the brightness of the first main region 11 and the second main region 21. In such a case, when the brightness of the first main region 11 and that of the second main region 21 are different in the same viewing angle, the viewer cannot precisely read the displayed images (pictures or texts) in the side viewing direction. Consequently, the displayed images can be kept in secret.

Figure 2A:
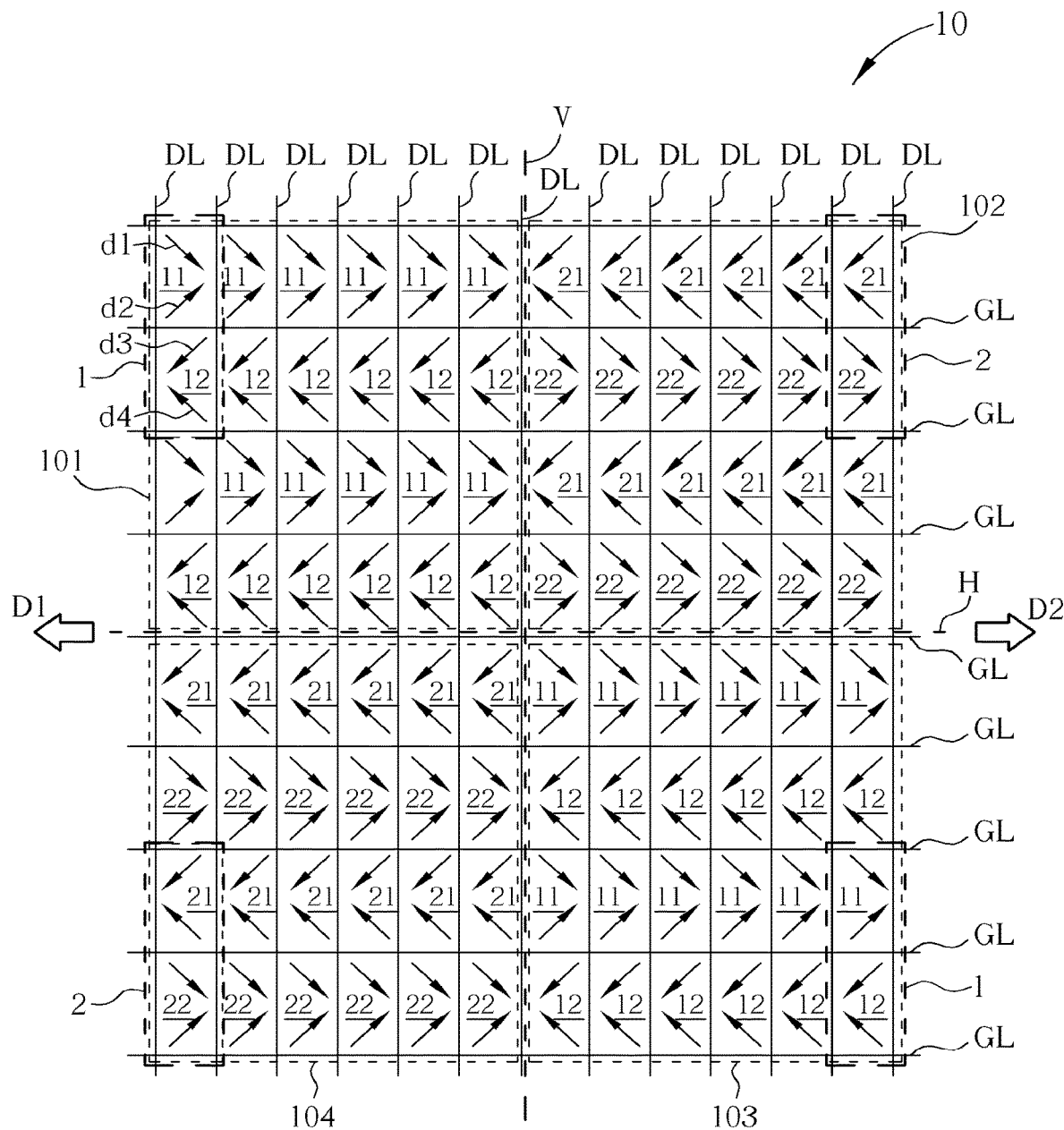
FIG. 2A illustrates the liquid crystal display panel of the present embodiment in a wide viewing mode.
Figure 2B:
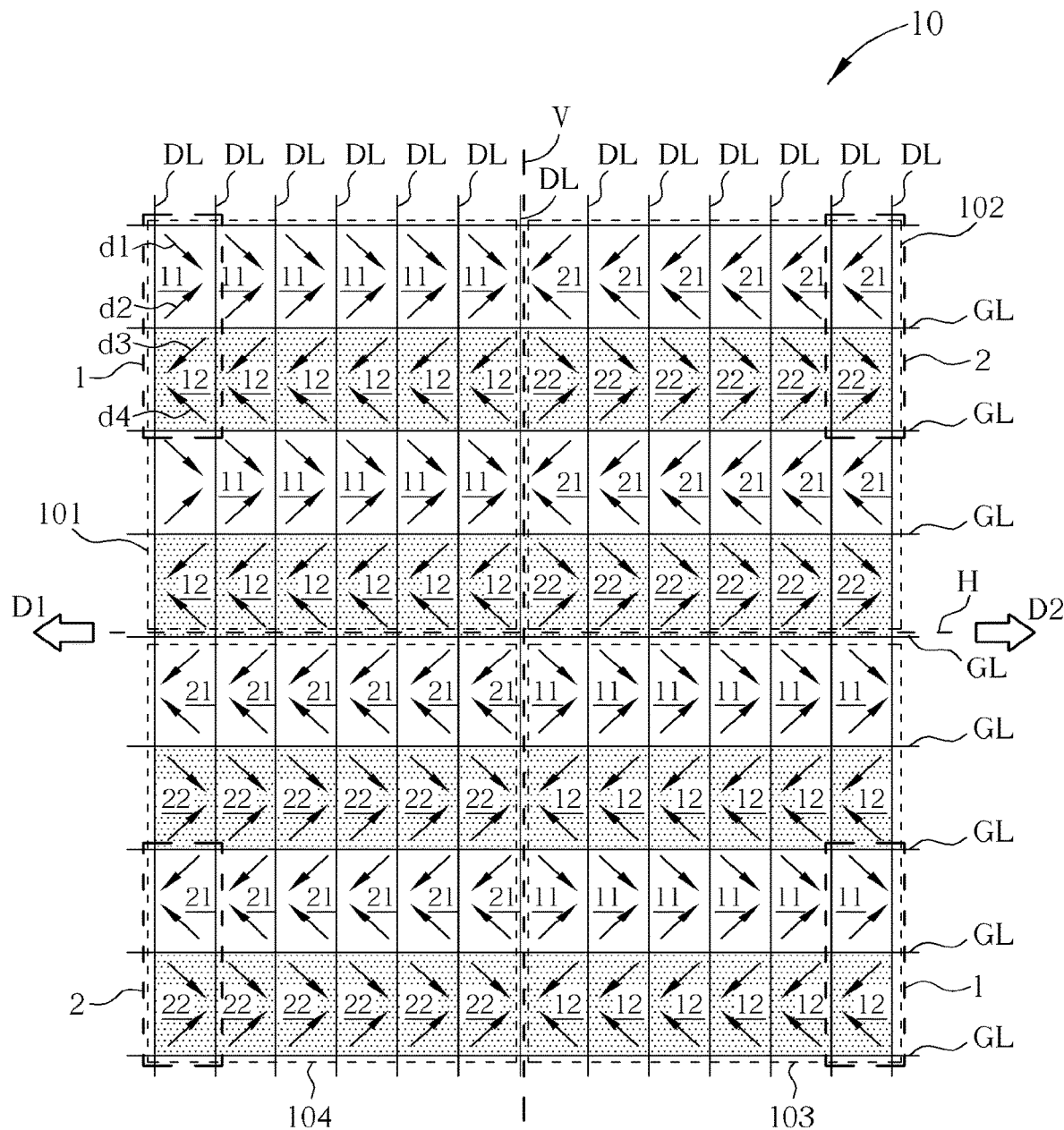
FIG. 2B illustrates the liquid crystal display panel of the present embodiment in a narrow viewing mode.
Figure 3:
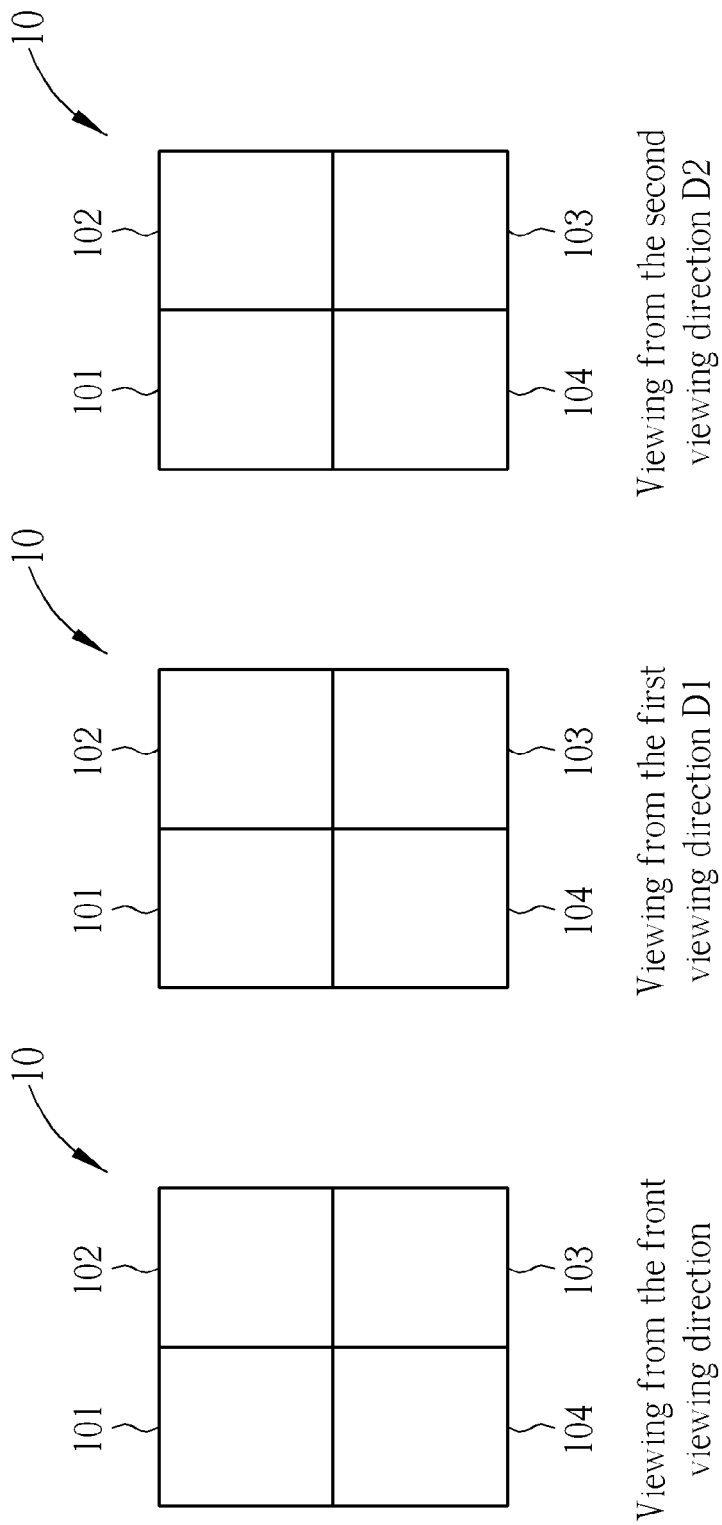
FIG. 3 illustrates the liquid crystal display panel of the present embodiment in a wide viewing angle mode when viewing in a front viewing direction and in a side viewing direction.
Figure 4:
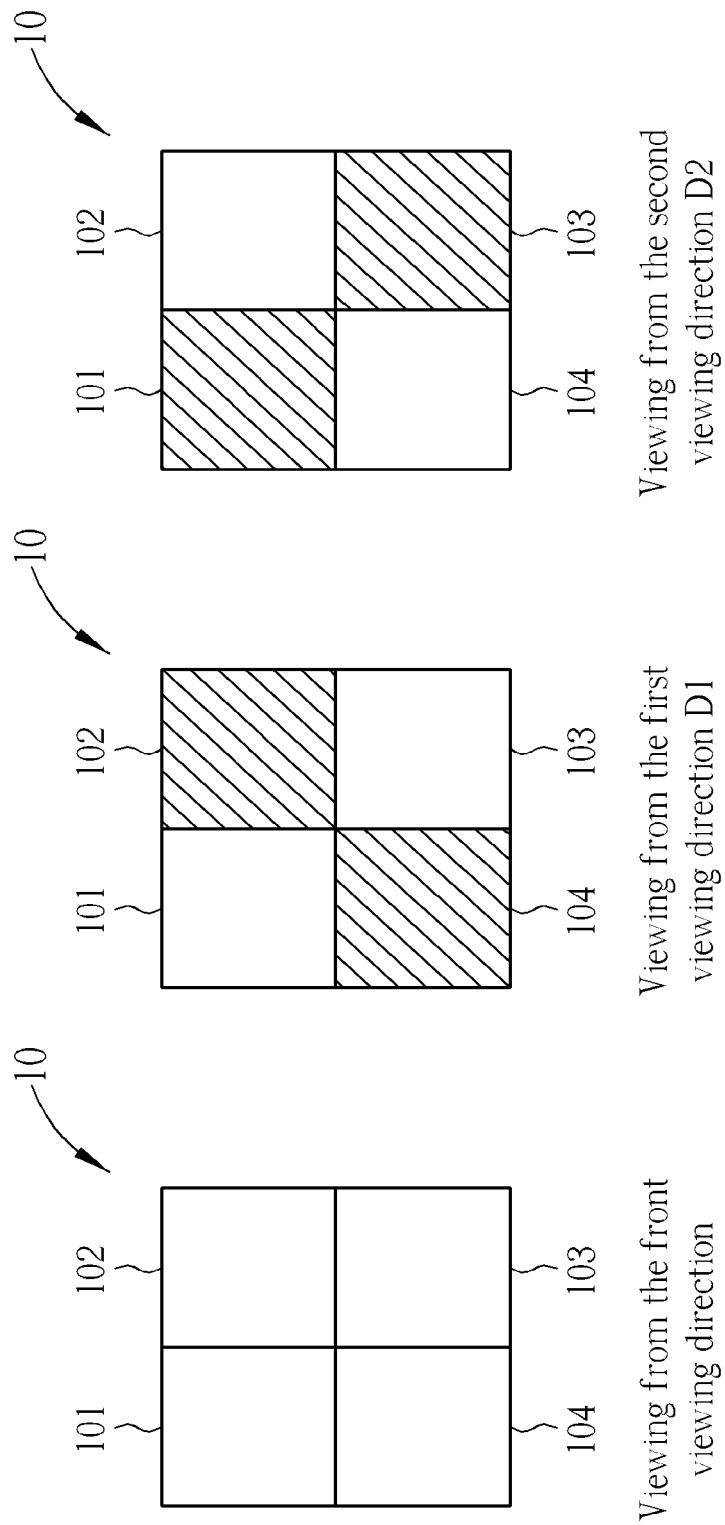
FIG. 4 illustrates the liquid crystal display panel of the present embodiment in a narrowing viewing angle mode when viewing in a front viewing direction and in a side viewing direction.

Please refer to FIG. 2A, FIG. 2B, FIG. 3 and FIG. 4. FIG. 2A, FIG. 2B, FIG. 3 and FIG. 4 are schematic diagrams illustrating a liquid crystal display panel according to a preferred embodiment of the present invention. FIG. 2A illustrates the liquid crystal display panel of the present embodiment in a wide viewing mode, FIG. 2B illustrates the liquid crystal display panel of the present embodiment in a narrow viewing mode, FIG. 3 illustrates the liquid crystal display panel of the present embodiment in a wide viewing angle mode when viewing in a front viewing direction and in a side viewing direction, and FIG. 4 illustrates the liquid crystal display panel of the present embodiment in a narrowing viewing angle mode when viewing in a front viewing direction and in a side viewing direction. For example, as shown in FIG. 2A, if the left side of the liquid crystal display panel 10 is defined as a first viewing direction (or namely first viewing angle direction) D1, and the right side of the liquid crystal display panel 10 is defined as a second viewing direction (or namely second viewing angle direction) D2, the luminous flux of the first main region 11 along the first viewing direction D1 will be different from the luminous flux of the first main region 11 along the second viewing direction D2, and the luminous flux of the second main region 21 along the first viewing direction D1 will be different from the luminous flux of the first main region 11 along the first viewing direction D1. The first viewing direction D1 and the second viewing direction D2 may be exchanged or defined in different manners as disclosed in the following description. In this embodiment, the electrode patterns of the first region 1 and the second region 2 are substantially symmetrical, which makes the luminous flux of the first main region 11 along the first viewing direction D1 substantially larger than the luminous flux of the first main region 11 along the second viewing direction D2. Similarly, the luminous flux of the second main region 21 along the second viewing direction D2 is substantially larger than the luminous flux of the second main region 21 along the first viewing direction D1, and the luminous flux of the first main region 11 along the first viewing direction D1 is substantially larger than the luminous flux of the second main region 21 along the first viewing direction D1. By virtue of the aforementioned distribution of luminous flux, the liquid crystal display panel 10 of the present embodiment can be a viewing angle switchable liquid crystal display panel, in which one display region may be divided into a plurality of domains. For instance, as shown in FIG. 3, the liquid crystal display panel 10 may be defined to include a first domain (or namely first zone) 101, a second domain (or namely second zone) 102, a third domain (or namely third zone) 103 and a forth domain (or namely forth zone) 104 by a vertical base line V and a horizontal base line H, but not limited thereto. The first domain 101 and the third domain 103 include a plurality of first regions 1, and the second domain 102 and the fourth domain 104 include a plurality of second regions 2. As shown in FIG. 2A and FIG. 3, in a wide viewing mode, all of the first regions 1 including the first main regions 11 and the first sub regions 12 and all of the second regions 2 including the second main regions 21 and the second sub regions 22 are turned on. Since total amount of the tilted direction of the liquid crystal molecules of the first main region 11 and the first sub region 12 is substantially symmetrical, and total amount of the tilted direction of the liquid crystal molecules of the second main region 21 and the second sub region 22 is substantially symmetrical, the liquid crystal display panel 10 of the present embodiment can provide sufficient brightness toward the front viewing direction, the first viewing direction D1 and the second viewing direction D2 for exhibiting wide viewing angle effect. On the other hand, as shown in FIG. 2B and FIG. 4, in a narrow viewing mode, the first main regions 11 in the first domain 101 and the first main regions 11 in the third domain 103 are turned on while the first sub regions 12 in the first domain 101 and the first sub regions 12 in the third domain 103 are turned off, and the second main regions 21 in the second domain 102 and second main regions 21 in the fourth domain 104 are turned on while the second sub regions 22 in the second domain 102 and the second sub regions 22 in the fourth domain 104 are turned off. Accordingly, the liquid crystal display panel 10 can provide brightness toward the front viewing direction, but only the turned-on first main regions 11 in the first domain 101 and first main regions 11 in the third domain 103 can provide brightness toward the first viewing direction D1, and only the turned-on second main regions 21 in the second domain 102 and second main regions 21 in the fourth domain 104 can provide brightness toward the second viewing direction D2. In such a case, the viewer in the first viewing direction D1 or in the second viewing direction D2 cannot see the entire displayed images clearly due to the interference caused by the difference of luminous flux. Therefore, the liquid crystal display panel 10 can exhibit anti-peeping effect.

Figure 5A:
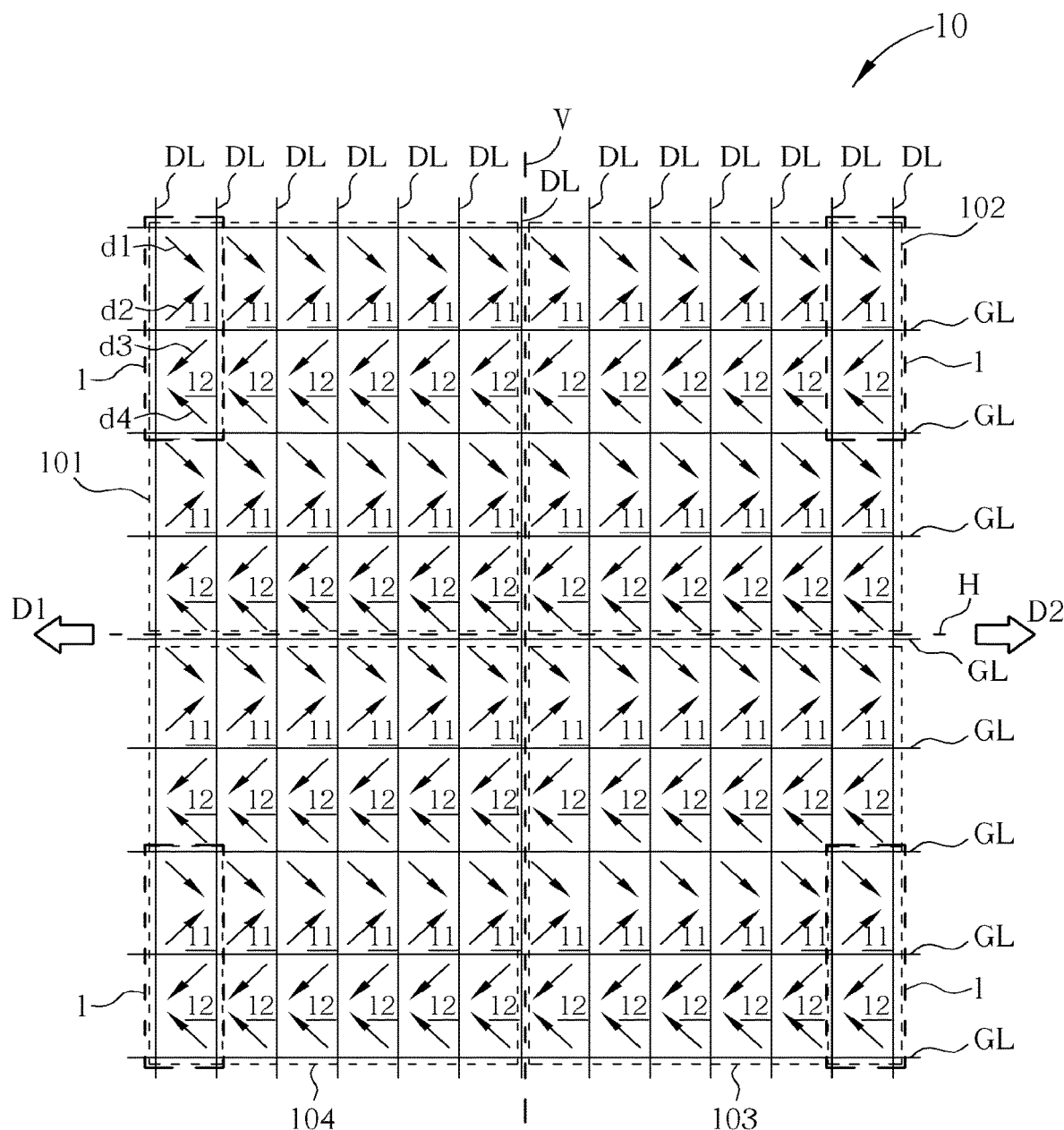
FIG. 5A illustrates the liquid crystal display panel in a wide viewing mode.
Figure 5B:
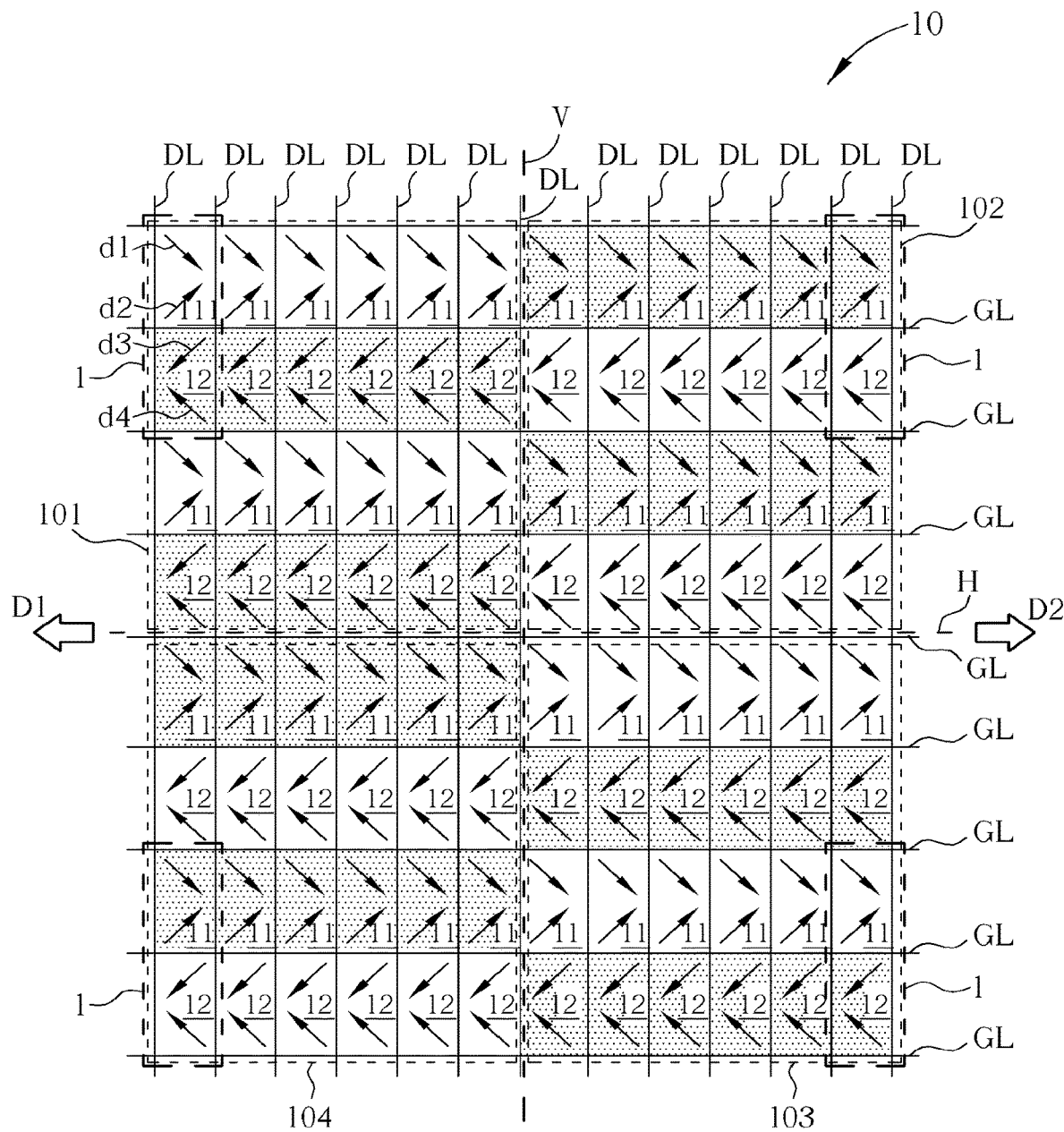
FIG. 5B illustrates the liquid crystal display panel in a narrow viewing mode.

Please refer to FIG. 5A and FIG. 5B, as well as FIGS. 3-4. FIG. 5A and FIG. 5B are schematic diagrams illustrating a liquid crystal display panel according to another embodiment of the present invention. FIG. 5A illustrates the liquid crystal display panel in a wide viewing mode, and FIG. 5B illustrates the liquid crystal display panel in a narrow viewing mode. As shown in FIG. 5A and FIG. 3, the liquid crystal display panel 10 may be defined to include a first domain (or namely first zone) 101, a second domain (or namely second zone) 102, a third domain (or namely third zone) 103 and a forth domain (or namely forth zone) 104 by a vertical base line V and a horizontal base line H, but not limited thereto. In this embodiment, each domain comprises a plurality of first regions 1 including the first main regions 11 and the first sub regions 12, and excludes the second regions 2. The design of the electrode pattern of the first subregions 12 of this embodiment is similar to that of the second main regions 21 of the aforementioned embodiment, and thus the same anti-peeping effect can be achieved. As shown in FIG. 3, in the wide viewing mode, the first main regions 11 and the first sub regions 12 of the first domain 101, the second domain 102, the third domain 103 and the fourth domain 104 are all turned on, and thus the liquid crystal display panel 10 can provide sufficient brightness toward the front viewing direction, the first viewing direction D1 and the second viewing direction D2 for exhibiting wide viewing angle effect. As shown in FIG. 5B and FIG. 4, in the narrow viewing mode, the first main region 11 of the first domain 101 and the first main region 11 of the third domain 103 are turned on while the first sub region 12 of the first domain 101 and first sub region 12 of the third domain 103 are turned off, and the first main region 11 of the second domain 102 and the first main region 11 of the fourth domain 104 are turned off while the first sub region 12 of the second domain 102 and the first sub region 12 of the fourth domain 104 are turned on. Therefore, only the first main regions 11 of the first domain 101 and the third domain 103 can provide brightness toward the first viewing direction D1, and only the first sub regions 12 of the second domain 102 and the fourth domain 104 can provide brightness toward the second viewing direction D2. In such a case, the viewer in the first viewing direction D1 or in the second viewing direction D2 cannot see the entire displayed images clearly due to the interference caused by the difference of luminous flux. Therefore, the liquid crystal display panel 10 can exhibit anti-peeping effect.

In the present invention, the different distribution of the luminous flux between the first region 1 and the second region 2 can be achieved by the pattern design of pixel electrode, but not limited thereto. For instance, the different distribution of the luminous flux between the first region 1 and the second region 2 can also be achieved by forming different rubbing direction of alignment films or by disposing protrusion bumps of different patterns in the first region 1 and the second region 2, respectively. The first main region 11 and the first sub region 12 can form a sub pixel, and the second main region 21 and the second sub region 22 can together form a sub pixel, but not limited thereto. For example, the first main region 11 can form a sub pixel, the first sub region 12 can form a sub pixel, the second main region 21 can form a sub pixel, and the second sub region 22 can form a sub pixel. In addition, the first viewing direction D1 and the second viewing direction D2 are not limited to be directions in the horizontal direction e.g. left direction and right direction, and can be modified based on different anti-peeping requirement. Also, the included angle between the first viewing direction D1 and the second viewing direction D2 is not limited to be 180 degrees, and can be any angle other than 0 degree.

The optical mechanism of the liquid crystal display panel will be detailed with reference to FIG. 2A and FIG. 2B. In this embodiment, the liquid crystal display panel 10 may be defined to include a plurality of domains such as a first domain 101, a second domain 102, a third domain 103 and a forth domain 104 by a vertical base line V and a horizontal base line H. In the first domain 101 and the third domain 103, a plurality of first regions 1 are disposed; in the second domain 102 and the fourth domain 104, a plurality of second regions 2 are disposed. In each first region 1, a portion of liquid crystal molecules LC are tilted along a first tilting direction d1. The liquid crystal molecules LC tiled along the first tilting direction d1 have smaller Δnd in the first tilting direction d1, and thus there is substantially no light leakage and no luminous flux in the first tilting direction d1. In other words, the main light emitting direction of the liquid crystal molecules LC tiled along the first tilting direction d1 is toward the direction opposite to the first tilting direction d1. In each first region 1, another portion of liquid crystal molecules LC are tilted along a second tilting direction d2. The liquid crystal molecules LC tiled along the second tilting direction d2 have smaller Δnd in the second tilting direction d2, and thus there is substantially no light leakage and no luminous flux in the second tilting direction d2. In other words, the main light emitting direction of the liquid crystal molecules LC tiled along the second tilting direction d2 is toward the direction opposite to the second tilting direction d2. Accordingly, in each first region 1, the luminous flux is smaller in the first tilting direction d1 and the second tilting direction d2, and most luminous flux is substantially toward the front viewing direction (not shown) and the first viewing direction D1 of the liquid crystal display panel 10. Here, the first viewing direction D1 is defined as the direction opposite to the common direction of both the first tilting direction d1 and the second tilting direction d2 (i.e. the left direction in FIG. 2A and FIG. 2B). On the other hand, in each second region 2, a portion of liquid crystal molecules LC are tilted along a third tilting direction d3. The liquid crystal molecules LC tiled along the third tilting direction d3 have smaller Δnd in the third tilting direction d3, and thus there is substantially no light leakage and no luminous flux in the third tilting direction d3. In other words, the main light emitting direction of the liquid crystal molecules LC tiled along the third tilting direction d3 is toward the direction opposite to the third tilting direction d3. In each second region 2, another portion of liquid crystal molecules LC are tilted along a fourth tilting direction d4. The liquid crystal molecules LC tiled along the fourth tilting direction d4 have smaller Δnd in the fourth tilting direction d4, and thus there is substantially no light leakage and no luminous flux in the fourth tilting direction d4. In other words, the main light emitting direction of the liquid crystal molecules LC tiled along the fourth tilting direction d4 is toward the direction opposite to the fourth tilting direction d4. Accordingly, in each second region 2, the luminous flux is smaller in the third tilting direction d3 and the fourth tilting direction d4, and most luminous flux is substantially toward the front viewing direction (not shown) and the second viewing direction D1 of the liquid crystal display panel 10. Here, the second viewing direction D2 is defined as the direction opposite to the common direction of both the third tilting direction d3 and the fourth tilting direction d4 (i.e. the right direction in FIG. 2A and FIG. 2B).

It is appreciated that the first viewing direction D1 and the second viewing direction D2 can be modified based on different anti-peeping requirement. Specifically, the included angle between the first viewing direction D1 and the second viewing direction D2 is substantially between 90 degrees and 180 degrees. For example, if the anti-peeping direction of the liquid crystal display panel 10 is required in the left side and right side, the included angle between the first viewing direction D1 and the second viewing direction D2 should be set as substantially 180 degrees. If the anti-peeping direction of the liquid crystal display panel 10 is required in an oblique direction, for instance in the upper-left direction (e.g. such as about 130 degrees to 140 degrees, specially about 135 degrees) and upper-right direction (e.g. such as about 40 degrees to 50 degrees, specially about 45 degrees), or in the bottom-left direction (e.g. such as about 220 degrees to 230 degrees, specially about 225 degrees) and bottom-right direction (e.g. such as about 310 degrees to 320 degrees, specially about 315 degrees), but not limited, the included angle between the first viewing direction D1 and the second viewing direction D2 should be set as substantially 90 degrees, and the first main regions 1 and the second main regions 2 should be optionally turned on in different domains. In such a case, the viewer cannot see the entire displayed images in the first viewing direction D1 and the second viewing direction D2. In addition, the luminous flux of the first region 1 is substantially toward the first viewing direction D1, but the light beams of the first region 1 emit divergently to some extent in practice. For example, the emitting light beams of the first region 1 are symmetric with respect to the first viewing direction D1, and the coverage of the light beams can be modified based on viewing angle requirement such as within 180 degrees. Similarly, the luminous flux of the second region 2 is substantially toward the second viewing direction D2, but the light beams of the second region 2 emit divergently to some extent in practice. For example, the emitting light beams of the second region 2 are symmetric with respect to the second viewing direction D2, and the coverage of the light beams can be modified based on viewing angle requirement such as within 180 degrees. In other word, even though the first viewing direction D1 and the second viewing direction D2 are defined as the left side direction and the right side direction, in the narrow viewing mode, the liquid crystal display panel 10 may have some anti-peeping effect at other view angles except for the upper viewing direction and the bottom viewing direction. However, the best anti-peeping effect can be achieved in the first viewing direction D1 and the second viewing direction D2.

As shown in FIG. 2A and FIG. 3, in the wide viewing mode, all of the first main regions 11, the first sub regions 12, the second main regions 21 and the second sub regions 22 in the first domain 101, the second domain 102, the third domain 103 and the fourth domain 104 are turned on, thereby providing brightness. In other words, the overall luminous flux of the first regions 1 is substantially equal to the overall luminous flux of the second regions 2 in different domains. Consequently, when viewing from the front viewing direction, the first domain 101, the second domain 102, the third domain 103 and the fourth domain 104 of the liquid crystal display panel 10 can provide brightness, thereby exhibiting normal display effect. When viewing from the first viewing direction D1 or the second viewing direction D2, the first domain 101, the second domain 102, the third domain 103 and the fourth domain 104 of the liquid crystal display panel 10 can also provide brightness, thereby exhibiting normal display effect. However, the brightness and information in the first viewing direction D1 and the second viewing direction D2 is substantially lower than the brightness and information in the front viewing direction.

As shown in FIG. 2B and FIG. 4, in the narrow viewing mode, in the first domain 101 and in the third domain 103, the first main regions 11 are turned on and provide brightness while the first sub domains 12 are turned off and do not provide brightness; in the second domain 102 and the fourth domain 104, the second main regions 21 are turned on and provide brightness while the second sub domains 22 are turned off and do not provide brightness. That is to say, the first sub regions 12 of the first domain 101 and the third domain 103 substantially have no luminous flux, but the first main regions 11 of the first domain 101 and the third domain 103 have luminous flux in the first viewing direction D1; the second sub regions 22 of the second domain 102 and the fourth domain 104 substantially have no luminous flux, but the second main regions 21 of the second domain 102 and the fourth domain 104 have luminous flux in the second viewing direction D2. In such a case, when viewing from the front viewing direction, the liquid crystal display panel 10 can provide normal display effect. When viewing from the first viewing direction D1, the viewer can see the images provided by the first domain 101 and the third domain 103, but cannot see the images provided by the second domain 102 and the fourth domain 104. Therefore, the viewer in the first viewing direction D1 cannot see the entire images (or namely complete images or intact images). Similarly, when viewing from the second viewing direction D2, the viewer can see the images provided by the second domain 102 and the fourth domain 104, but cannot see the images provided by the first domain 101 and the third domain 103. Therefore, the viewer in the second viewing direction D2 cannot see the entire images. Consequently, the liquid crystal display panel 10 can provide anti-peeping effect in the narrow viewing mode.

In this embodiment, each first main region 11, each second main region 21, each first sub region 12 and each second sub region 22 as a sub pixel, respectively, e.g. a red sub pixel, a green sub pixel, a blue sub pixel or a sub pixel for displaying any other color. Each first main region 11, each second main region 21, each first sub region 12 and each second sub region 22 is disposed between two adjacent gate line GL and two adjacent data line DL, but not limited. For example, in another preferred embodiment, each first main region 11 and an adjacent first sub region 12 can together form a sub pixel, and each second main region 21 and an adjacent second sub region 22 can together form a sub pixel. The first main region 11, the second main region 21, the first sub region 12 and the second sub region 22 can be turned on simultaneously, or one of the first main region 11 and the second main region 21 can be turned on while the other of them can be turned off, or one of the first sub region 12 and the second sub region 22 can be turned on while the other of them is turned off.

It is to be appreciated that the number and location of domains is not limited by the above embodiment, and can be modified based on different anti-peeping requirement. In addition, since the tilting direction of the liquid crystal molecules LC is the direction where no light is leaking, the tilting directions of the liquid crystal molecules LC in the first region 1 and the second region 2 can be modified or increased to obtain the anti-peeping effect in desired directions.

The distribution of luminous flux in the first regions 1 and the second regions 2 may be altered by changing the tilting directions of the liquid crystal molecules, for instance, by changing the pattern design of the pixel electrode, the rubbing direction of alignment layers or disposing protrusion bumps of different patterns. In the following descriptions, embodiments of different pattern designs of the pixel electrode for controlling the luminous flux of the first regions 1 and the second regions 2 are listed, but not limited thereto. In order to compare the differences between different embodiments, same components are denoted by same numerals, and repeated parts are not redundantly described.

Figure 6A:
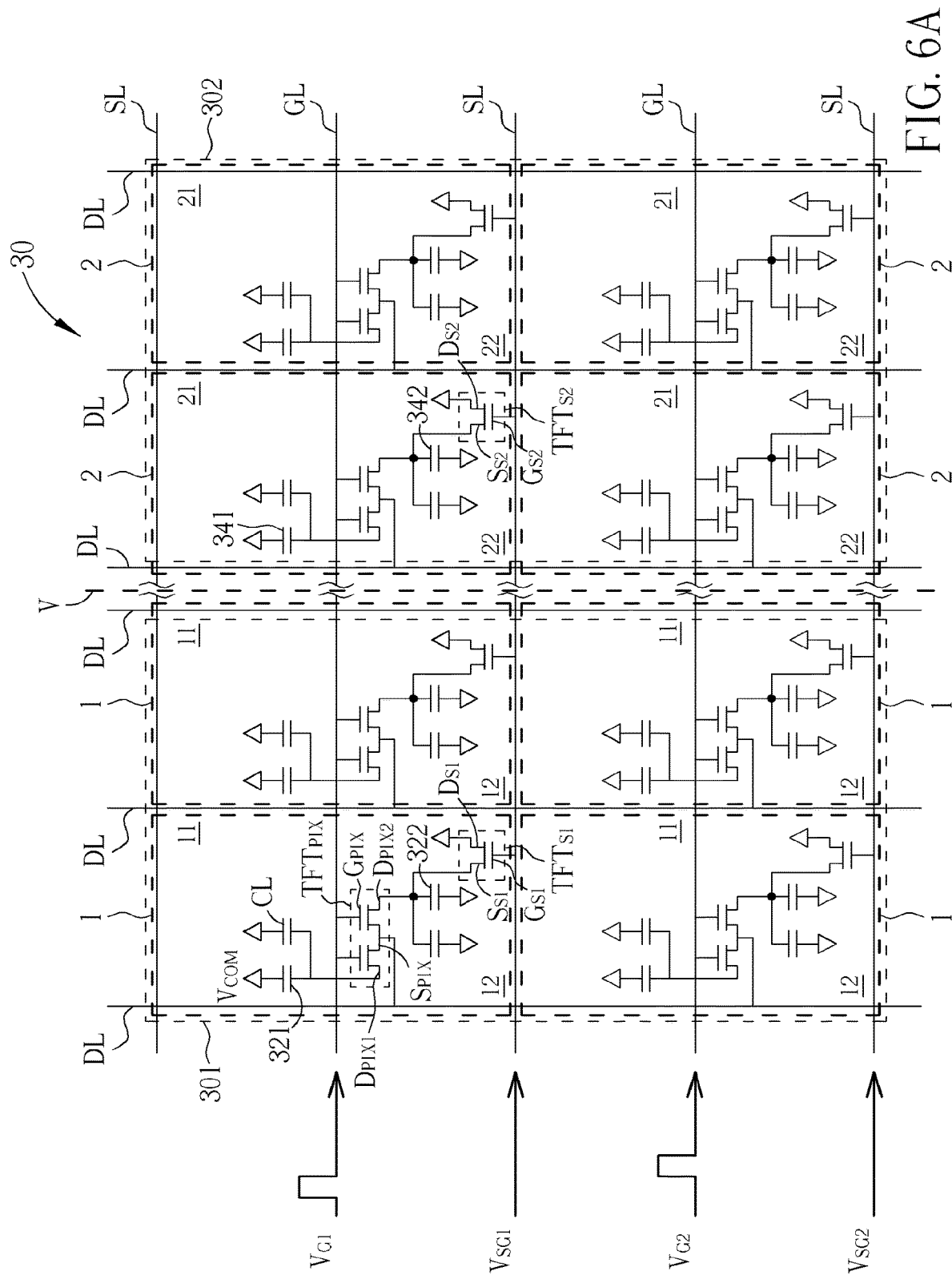
FIG. 6A is a circuit diagram of the liquid crystal display panel in a wide viewing mode.
Figure 6B:
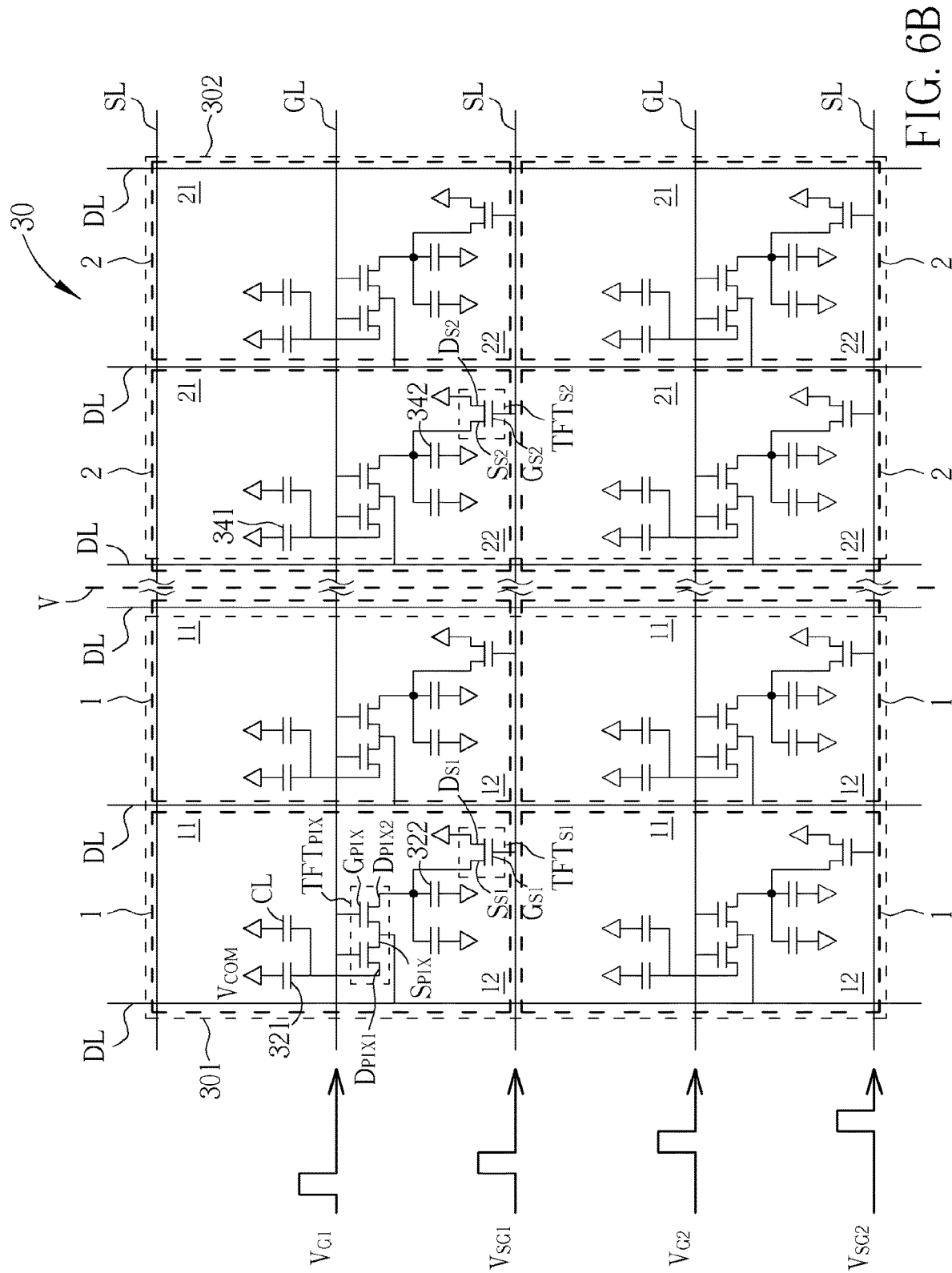
FIG. 6B is a circuit diagram of the liquid crystal display panel in a narrow viewing mode.

Please refer to FIG. 6A and FIG. 6B. FIG. 6A and FIG. 6B are schematic diagrams illustrating the circuitry of the liquid crystal display panel according to a preferred embodiment of the present invention. The circuitry of this embodiment may be applied in the liquid crystal display panel of FIG. 2A and FIG. 2B. FIG. 6A is a circuit diagram of the liquid crystal display panel in a wide viewing mode, and FIG. 6B is a circuit diagram of the liquid crystal display panel in a narrow viewing mode. As shown in FIG. 6A and FIG. 6B, a sub pixel is defined between two adjacent gate lines GL and two adjacent data lines DL. Each first main region 11 and an adjacent first sub region 12 together form a sub pixel, and each second main region 21 and an adjacent second sub region 22 together form a sub pixel. In addition, the liquid crystal display panel 30 is divided into a first domain (or namely first zone) 301 and a second domain (or namely second zone) 302 by a vertical base line V, but not limited thereto. A plurality of first regions 1 are disposed in the first domain 301, and a plurality of second regions 2 are disposed in the second domain 302. The liquid crystal display panel 30 further includes a plurality of selecting lines SL, a plurality of common lines CL, a plurality of first main pixel electrodes 321, a plurality of first sub pixel electrodes 322, a plurality of second main pixel electrodes 341, a plurality of second sub pixel electrodes 342, a plurality of pixel switching devices TFTPIX, a plurality of first selecting switching devices TFTS1, and a plurality of second selecting switching devices TFTS2. Each pixel switching device TFTPIX is disposed in a corresponding sub pixel, and located between the first main region 11 and the first sub region 12, or between the second main region 21 and the second sub region 22. The first main pixel electrode 321 and the first sub pixel electrode 322 are disposed in the first main region 11 and the first sub region 12, respectively, and the first main pixel electrode 321 and the first sub pixel electrode 322 have different electrode patterns. The second main pixel electrode 341 and the second sub pixel electrode 342 are disposed in the second main region 21 and the second sub region 22, respectively, and the second main pixel electrode 341 and the second sub pixel electrode 342 have different electrode patterns. The pixel switching device TFTPIX includes a gate GPIX electrically connected to the corresponding gate line GL, a source SPIX electrically connected to the corresponding data line DL, a first drain DPIX1 electrically connected to the first main pixel electrode 321 of the first domain 301 or the second main pixel electrode 341 of the second domain 302, and a second drain DPIX2 electrically connected to the first sub pixel electrode 322 of the first domain 301 or the second sub pixel electrode 342 of the second domain 302. In addition, the first selecting switching device TFTS1 is disposed in the sub pixel of the first domain 301, and each first selecting switching device TFTS1 includes a gate GS1 electrically connected to the corresponding selecting line SL, a source SS1 electrically connected to the first sub pixel electrode 322 of the first domain 301, and a drain DS1 electrically connected to the corresponding common line CL to receive a common voltage VCOM. The second selecting switching device TFTS2 is disposed in the sub pixel of the second domain 302, and each second selecting switching device TFTS2 includes a gate GS2 electrically connected to the corresponding selecting line SL, a source SS2 electrically connected to the second sub pixel electrode 342 of the second domain 302, and a drain DS2 electrically connected to the corresponding common line CL. As shown in FIG. 6A, in the wide viewing mode, the pixel switching devices TFTPIX are orderly driven by different gate signals, for instance by a first gate signal VG1 and a second gate signal VG2 whose timing is behind that of the first gate signal VG1 to be turned on successively, while the first selecting switching device TFTS1 and the second selecting switching device TFTS2 are turned off. When the pixel switching device TFTPIX is turned on, and when the first selecting switching device TFTS1 and the second selecting switching device TFTS2 are turned off, the first main regions 11, the first sub regions 12, the second main regions 21 and the second sub regions 22 of all domains can display normally. As shown in FIG. 6B, in the narrow viewing mode, the pixel switching devices TFTPIX are orderly driven by a first gate signal VG1 and a second gate signal VG2 to be turned on successively, and the first selecting switching device TFTS1 and the second selecting switching devices TFTS2 are orderly driven by a first selecting gate signal VSG1 and a second selecting gate signal VSG2 to be turned on successively. The timing of the first selecting gate signal VSG1 is behind the timing of the first gate signal VG1, the timing of the second gate signal VG2 is behind the timing of the first selecting gate signal VSG1, the timing of the second selecting gate signal VSG2 is behind the timing of the second gate signal VG2, and all the gate signals and the selecting gate signals are applied in the above order. When the first selecting switching device TFTS1 and the second selecting switching device TFTS2 are turned on, the corresponding first sub pixel electrodes 322 of the first sub regions 12 of the first domain 301 and the corresponding second sub pixel electrodes 342 of the second sub regions 22 of the second domain 302 will be received with the common voltage Vcom, and thus the first sub regions 12 of the first domain 301 and the second sub regions 22 of the second domain 302 will be in a dark state for not providing luminous flux. By virtue of the selecting lines SL, the first selecting switching device TFTS1 and the second selecting switching device TFTS2 operated by the aforementioned driving method, the liquid crystal display panel 30 of the present embodiment can selectively provide the wide viewing mode or the narrow viewing mode.

Figure 7A:
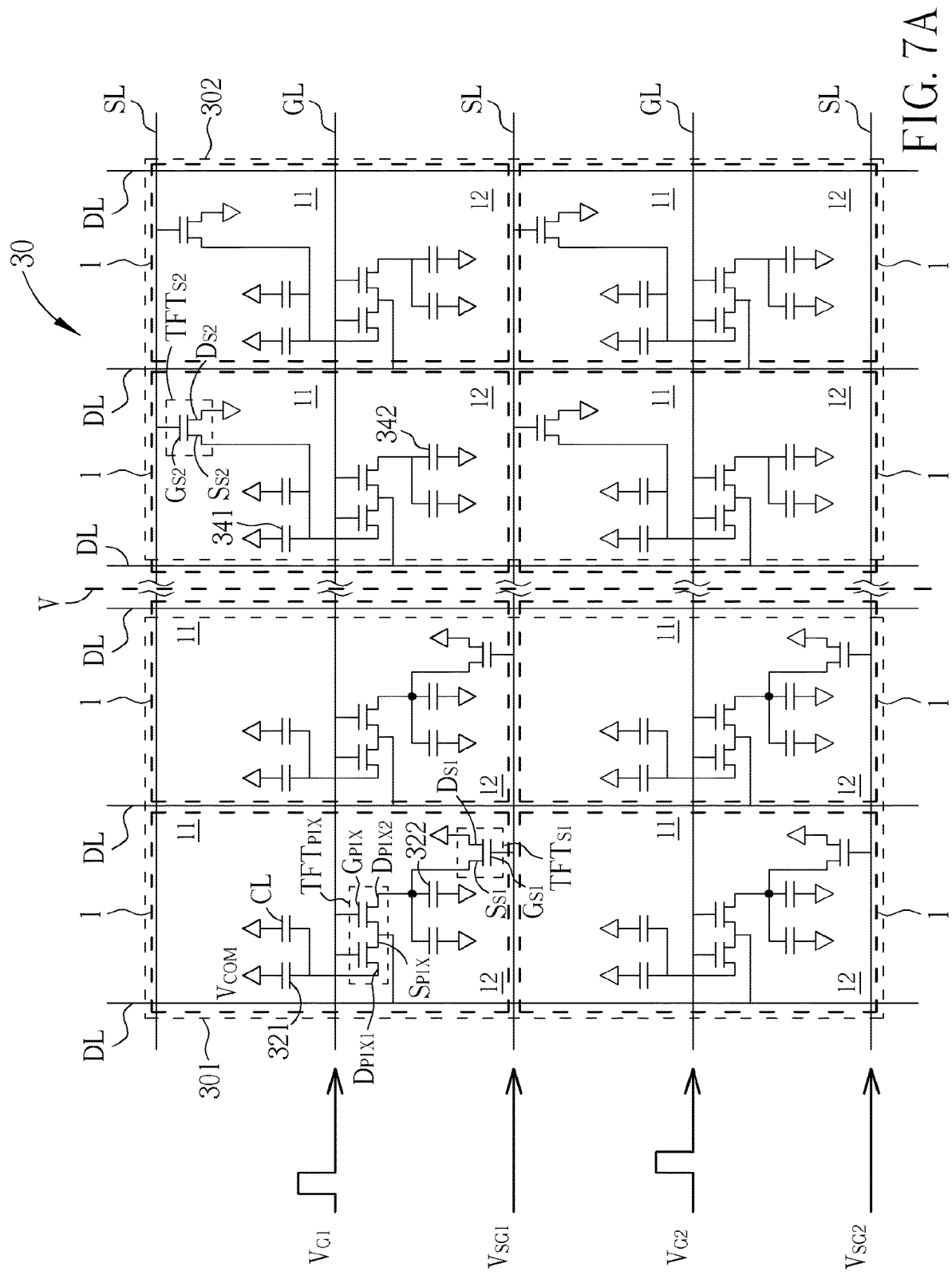
FIG. 7A is a circuit diagram of the liquid crystal display panel in a wide viewing mode.
Figure 7B:
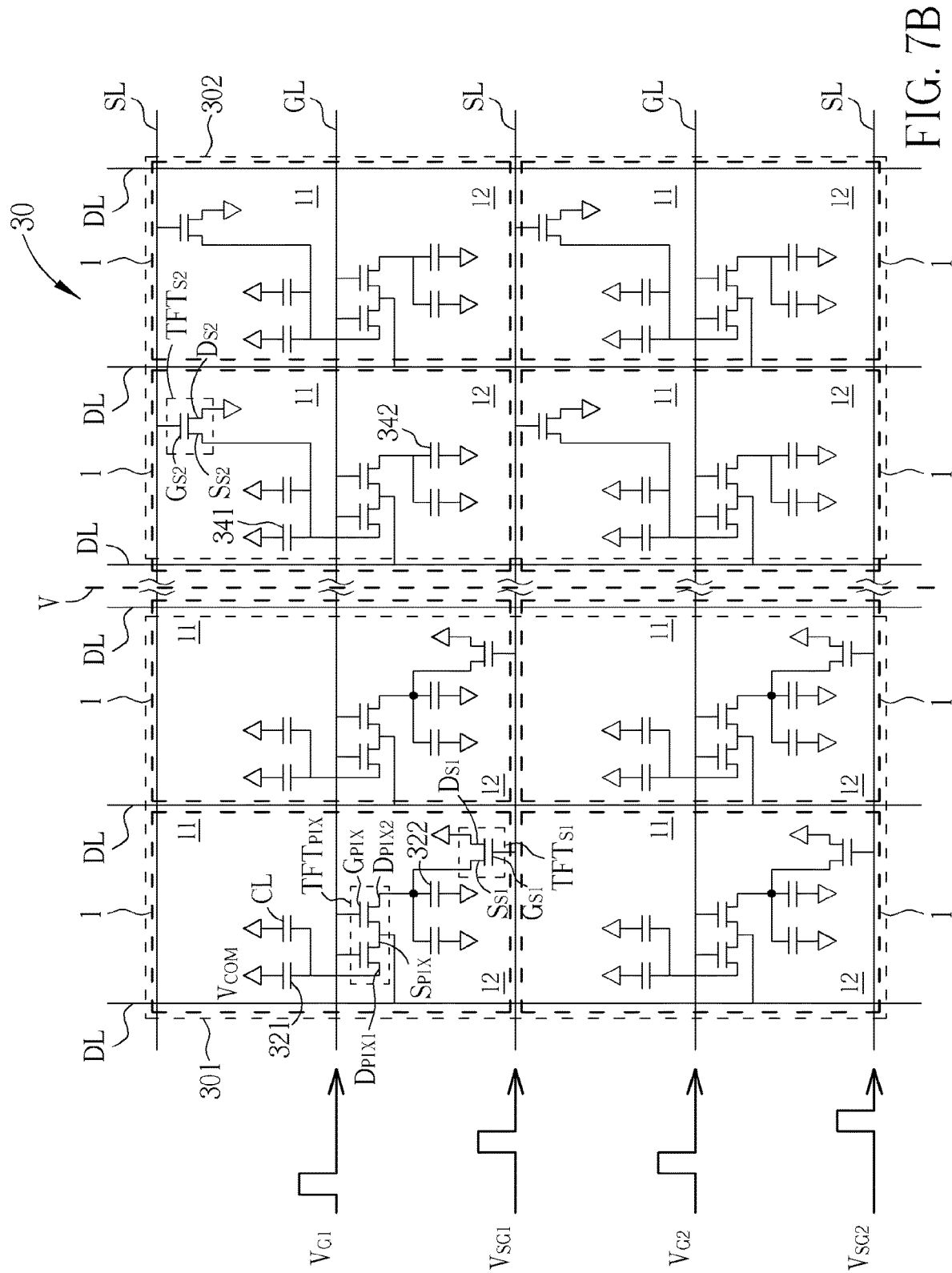
FIG. 7B is a circuit diagram of the liquid crystal display panel in a narrow viewing mode.

Please refer to FIG. 7A and FIG. 7B. FIG. 7A and FIG. 7B are schematic diagrams illustrating the circuitry of the liquid crystal display panel according to another preferred embodiment of the present invention. The circuitry of this embodiment may be applied in the liquid crystal display panel of FIG. 5A and FIG. 5B. FIG. 7A is a circuit diagram of the liquid crystal display panel in a wide viewing mode, and FIG. 7B is a circuit diagram of the liquid crystal display panel in a narrow viewing mode. As shown in FIG. 7A and FIG. 7B, a sub pixel is defined between two adjacent gate lines GL and two adjacent data lines DL, and each first main region 11 and an adjacent first sub region 12 together form a sub pixel. The liquid crystal display panel 30 is divided into a first domain 301 and a second domain 302 by a vertical base line V, but not limited thereto. The first domain 301 and the second domain 302 only include the first regions 1. The liquid crystal display panel 30 further includes a plurality of selecting lines SL, a plurality of common lines CL, a plurality of first main pixel electrodes 321, a plurality of first sub pixel electrodes 322, a plurality of pixel switching devices TFTPIX, a plurality of first selecting switching devices TFTS1, and a plurality of second selecting switching devices TFTS2. Each pixel switching device TFTPIX is disposed in a corresponding sub pixel, and located between the first main region 11 and the first sub region 12. The first main pixel electrode 321 and the first sub pixel electrode 322 are disposed in the first main region 11 and the first sub region 12, respectively, and the first main pixel electrode 321 and the first sub pixel electrode 322 have different electrode patterns. The pixel switching device TFTPIX includes a gate GPIX electrically connected to the corresponding gate line GL, a source SPIX electrically connected to the corresponding data line DL, a first drain DPIX1 electrically connected to the first main pixel electrode 321, and a second drain DPIX2 electrically connected to the first sub pixel electrode 322. In addition, the first selecting switching device TFTS1 is disposed in the sub pixel of the first domain 301, and each first selecting switching device TFTS1 includes a gate GS1 electrically connected to the corresponding selecting line SL, a source SS1 electrically connected to the first sub pixel electrode 322, and a drain DS1 electrically connected to the corresponding common line CL to receive a common voltage VCOM. The second selecting switching device TFTS2 is disposed in the sub pixel of the second domain 302, and each second selecting switching device TFTS2 includes a gate GS2 electrically connected to the corresponding selecting line SL, a source SS2 electrically connected to the first main pixel electrode 321, and a drain DS2 electrically connected to the corresponding common line CL. As shown in FIG. 7A, in the wide viewing mode, the pixel switching devices TFTPIX are orderly driven by different gate signals, for instance by a first gate signal VG1 and a second gate signal VG2 whose timing is behind that of the first gate signal VG1 to be turned on successively, while the first selecting switching device TFTS1 and the second selecting switching device TFTS2 are turned off. When the pixel switching device TFTPIX is turned on, and when the first selecting switching device TFTS1 and the second selecting switching device TFTS2 are turned off, all the first main regions 11 and the first subregions 12 in the first domain 301 and the second domain 302 can display normally. As shown in FIG. 7B, in the narrow viewing mode, the pixel switching devices TFTPIX are orderly driven by a first gate signal VG1 and a second gate signal VG2 to be turned on successively, and the first selecting switching device TFTS1 and the second selecting switching devices TFTS2 are orderly driven by a first selecting gate signal VSG1 and a second selecting gate signal VSG2 to be turned on successively. The timing of the second selecting gate signal VSG2 is behind the timing of the first gate signal VG1, the timing of the first selecting gate signal VSG1 is behind the timing of the second gate signal VG2, and the timing of the second selecting gate signal VSG2 is behind the timing of the first selecting gate signal VSG1. When the first selecting switching device TFTS1 and the second selecting switching device TFTS2 are turned on, the corresponding first sub pixel electrodes 322 of the first sub regions 12 of the first domain 301 and the corresponding first main pixel electrodes 321 of the first main regions 11 of the second domain 302 will be received with the common voltage Vcom, and thus the first sub regions 12 of the first domain 301 and the first main regions 11 of the second domain 302 will be in a dark state for not providing luminous flux. By virtue of the selecting lines SL, the first selecting switching device TFTS1 and the second selecting switching device TFTS2 operated by the aforementioned driving method, the liquid crystal display panel 30 of the present embodiment can selectively provide the wide viewing mode or the narrow viewing mode.

The driving method of the liquid crystal display panel of the present invention is not limited to the driving method for driving the first main regions 11, the first sub regions 12, the second main regions 21 and the second sub regions 22 disclosed in the embodiment of FIG. 6A and FIG. 6B, and the driving method for driving the first main regions 11 and the first sub regions 12 disclosed in the embodiment of FIG. 7A and FIG. 7B. The liquid crystal display panel of the present invention can also be driven, for instance, by independent gate lines and data lines, or by shared gate lines with different data lines (i.e. 2D1G driving method), or by shared data lines with different gate lines (i.e. 2G1D driving method).

As described, the direction of the luminous flux in the first regions and the second regions of the liquid crystal display panel can be decided by the tilting direction of liquid crystal molecules, and the tilting direction of liquid crystal molecules can be adjusted by designing the pattern of the pixel electrode. In the following description, different pattern designs of the pixel electrode of the present invention will be illustrated in detail.

Figure 8:
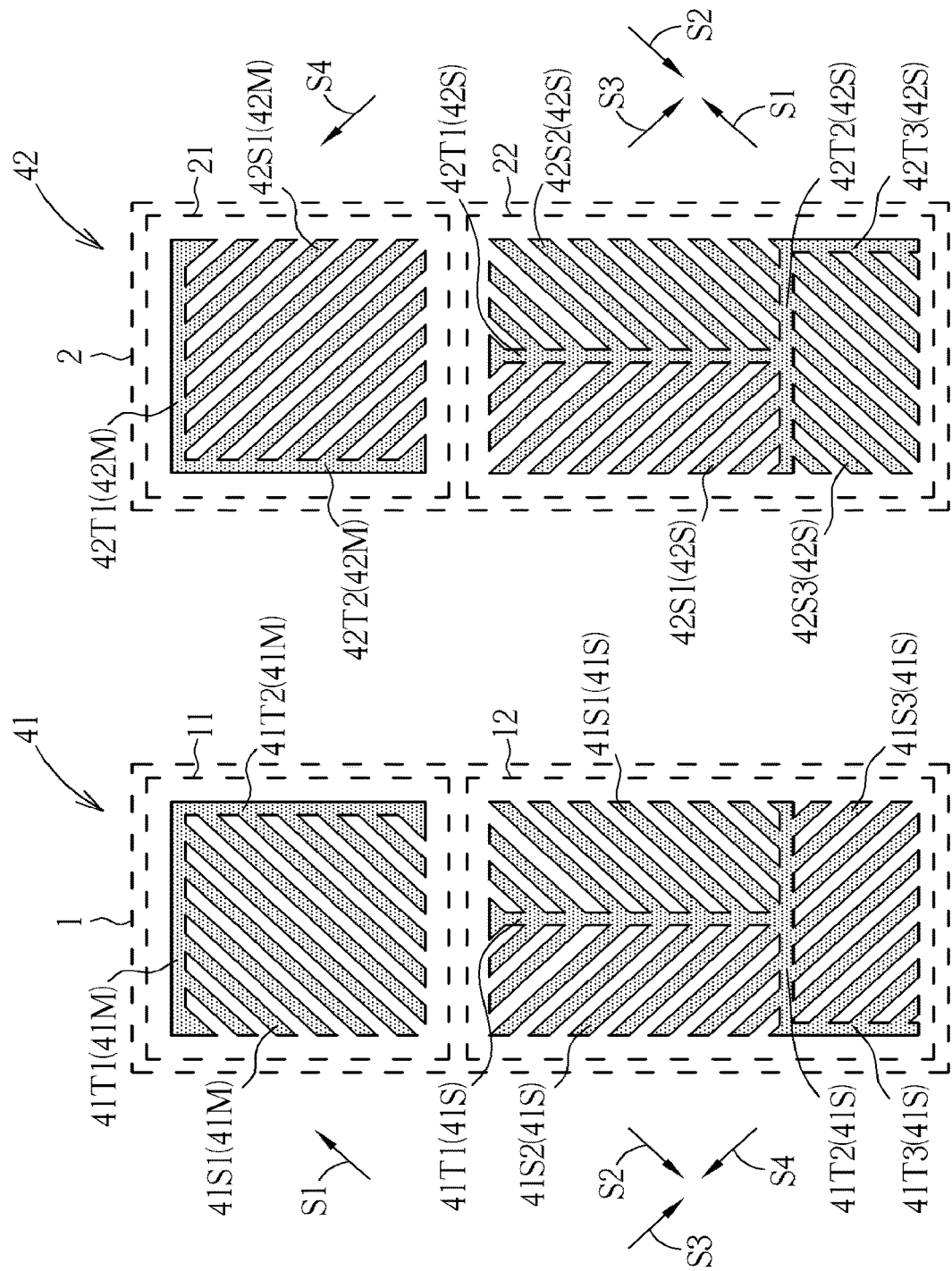
FIG. 8 is a schematic diagram illustrating a first pixel electrode and a second pixel electrode of the liquid crystal display panel according to a first preferred embodiment of the present invention.

Please refer to FIG. 8. FIG. 8 is a schematic diagram illustrating a first pixel electrode and a second pixel electrode of the liquid crystal display panel according to a first preferred embodiment of the present invention. As shown in FIG. 8, the first pixel electrode 41 is disposed in a first region 1, and the first pixel electrode 41 includes a first main pixel electrode 41M disposed on a first main region 11 of the first region 1, and a first sub pixel electrode 41S disposed in a first sub region 12 of the first region 1. The first main pixel electrode 41M includes a first trunk electrode 41T1, a second trunk electrode 41T2 and a plurality of first branches 41S1. The first trunk electrode 41T1 and the second trunk electrode 41T2 of the first main pixel electrode 41M are electrically connected to each other and substantially arranged perpendicularly. Specifically, one end of the first trunk electrode 41T1 and one end of the second trunk electrode 41T2 of the first main pixel electrode 41M are electrically connected together, substantially forming an L-shaped electrode or L-shaped like. The first branches 41S1 of the first main pixel electrode 41M are electrically connected to one of the first trunk electrode 41T1 and the second trunk electrode 41T2, and the first branches 41S1 of the first main pixel electrode 41M are substantially arranged in parallel along a first direction S1. The first sub pixel electrode 41S includes a first trunk electrode 41T1, a second trunk electrode 41T2, a third trunk electrode 41T3, a plurality of first branches 41S1, a plurality of second branches 41S2 and a plurality of third branches 41S3. The first trunk electrode 41T1 and the second trunk electrode 41T2 of the first sub pixel electrode 41S are electrically connected to each other and substantially arranged perpendicularly, the second trunk electrode 41T2 and the third trunk electrode 41T3 of the first sub pixel electrodes 41S are electrically connected to each other and substantially arranged perpendicularly. Specifically, one end of the first trunk electrode 41T1 and one side of the second trunk electrode 41T2 are electrically connected together, and one end of the second trunk electrode 41T2 and one end of the third trunk electrode 41T3 are electrically connected together. The first branches 41S1 of the first sub pixel electrode 41S are electrically connected to one of the first trunk electrode 41T1 and the second trunk electrode 41T2, the second branches 41S2 of the first sub pixel electrode 41S are electrically connected to one of the first trunk electrode 41T1 and the second trunk electrode 41T2, and the third branches 41S3 of the first sub pixel electrode 41S are electrically connected to one of the second trunk electrode 41T2 and the third trunk electrode 41T3. The first branches 41S1 of the first sub pixel electrode 41S are substantially arranged in parallel along a second direction S2, the second branches 41S2 of the first sub pixel electrode 41S are substantially arranged in parallel along a third direction S3, and the third branches 41S3 of the first sub pixel electrode 41S are substantially arranged in parallel along a fourth direction S4. The second pixel electrode 42 further includes a second main pixel electrode 42M disposed on a second main region 21 of the second region 2, and a second sub pixel electrode 42S disposed in a second sub region 22 of the second region 2. The second main pixel electrode 42M includes a first trunk electrode 42T1, a second trunk electrode 42T2 and a plurality of first branches 42S1. The first trunk electrode 42T1 and the second trunk electrode 42T2 of the second main pixel electrodes 42M are electrically connected to each other and substantially arranged perpendicularly. Specifically, one end of the first trunk electrode 42T1 and one end of the second trunk electrode 42T2 are electrically connected together, substantially forming an L-shaped electrode or L-shaped like. The first branches 42S1 of the second main pixel electrode 42M are electrically connected to one of the first trunk electrode 42T1 and the second trunk electrode 42T2, the first branches 42S1 of the second main pixel electrode 42M are substantially arranged in parallel along the fourth direction S4. The second sub pixel electrode 42S includes a first trunk electrode 42T1, a second trunk electrode 42T2, a third trunk electrode 42T3, a plurality of first branches 42S1, a plurality of second branches 42S2 and a plurality of third branches 42S3. The first trunk electrode 42T1 and the second trunk electrode 42T2 of the second sub pixel electrodes 42S are electrically connected to each other and substantially arranged perpendicularly, and the second trunk electrode 42T2 and the third trunk electrode 42T3 of the second sub pixel electrodes 42S are electrically connected to each other and substantially arranged perpendicularly. Specifically, one end of the first trunk electrode 42T1 and one side of the second trunk electrode 42T2 are electrically connected together, and one end of the second trunk electrode 42T2 and one end of the third trunk electrode 42T3 are electrically connected together. The first branches 42S1 of the second sub pixel electrode 42S are electrically connected to one of the first trunk electrode 42T1 and the second trunk electrode 42T2, the second branches 42S2 of the second sub pixel electrode 42S are electrically connected to one of the first trunk electrode 42T1 and the second trunk electrode 42T2, and the third branches 42S3 of the second sub pixel electrode 42S are electrically connected to one of the second trunk electrode 42T2 and the third trunk electrode 42T3. The first branches 42S1 of the second sub pixel electrode 42S are substantially arranged in parallel along the third direction S3, the second branches 42S2 of the second sub pixel electrode 42S are substantially arranged in parallel along the second direction S2, and the third branches 42S3 of the second sub pixel electrode 42S are substantially arranged in parallel along the first direction S1. Specially, the first pixel electrode 41 and second pixel electrode 42 likes a mirror pixel electrode, but not limited it.

By virtue of the above design of pixel electrode, in the wide viewing mode, the first main region 11 and the first sub region 12 of the first region 1, and the second main region 21 and the second sub region 22 of the second region 2 can be controlled to be turned on simultaneously. In addition, by matching the area ratio of the main pixel electrode and the sub pixel electrode, the ratio of the liquid crystal molecules tilted in different directions within the main pixel electrode and the sub pixel electrode will be substantially the same. Consequently, a uniform brightness of the first regions 1 and the second regions 2 can be provided toward the front viewing direction and various different viewing directions, thereby exhibiting multi-domain wide viewing effect. In the narrow viewing mode, the first regions 1 and the second regions 2 can be controlled not to be all turned on. For instance, in the second domain 102 and the fourth domain 104, the second main regions 21 are turned on while the second sub regions 22 are turned off, and in the first domain 101 and the third domain 103, the first main regions 11 are turned on while the first sub regions 12 are turned off as illustrated in FIG. 2B. In such a case, the first regions 1 and the second regions 2 can provide brightness toward the front viewing direction, but the viewer can only see part of the displayed images from either the left side or the right side of the liquid crystal display panel. Thus, the anti-peeping effect can be ensured. According to the design of pixel electrode of this embodiment, the anti-peeping effect is valid in the upper-left viewing direction and the upper-right viewing direction, and the best anti-peeping effect is in the upper-left viewing direction (such as about 130 degrees to 140 degrees, specially about 135 degrees) and the upper-right viewing direction (such as about 40 degrees to 50 degrees, specially about 45 degrees).

Figure 9:
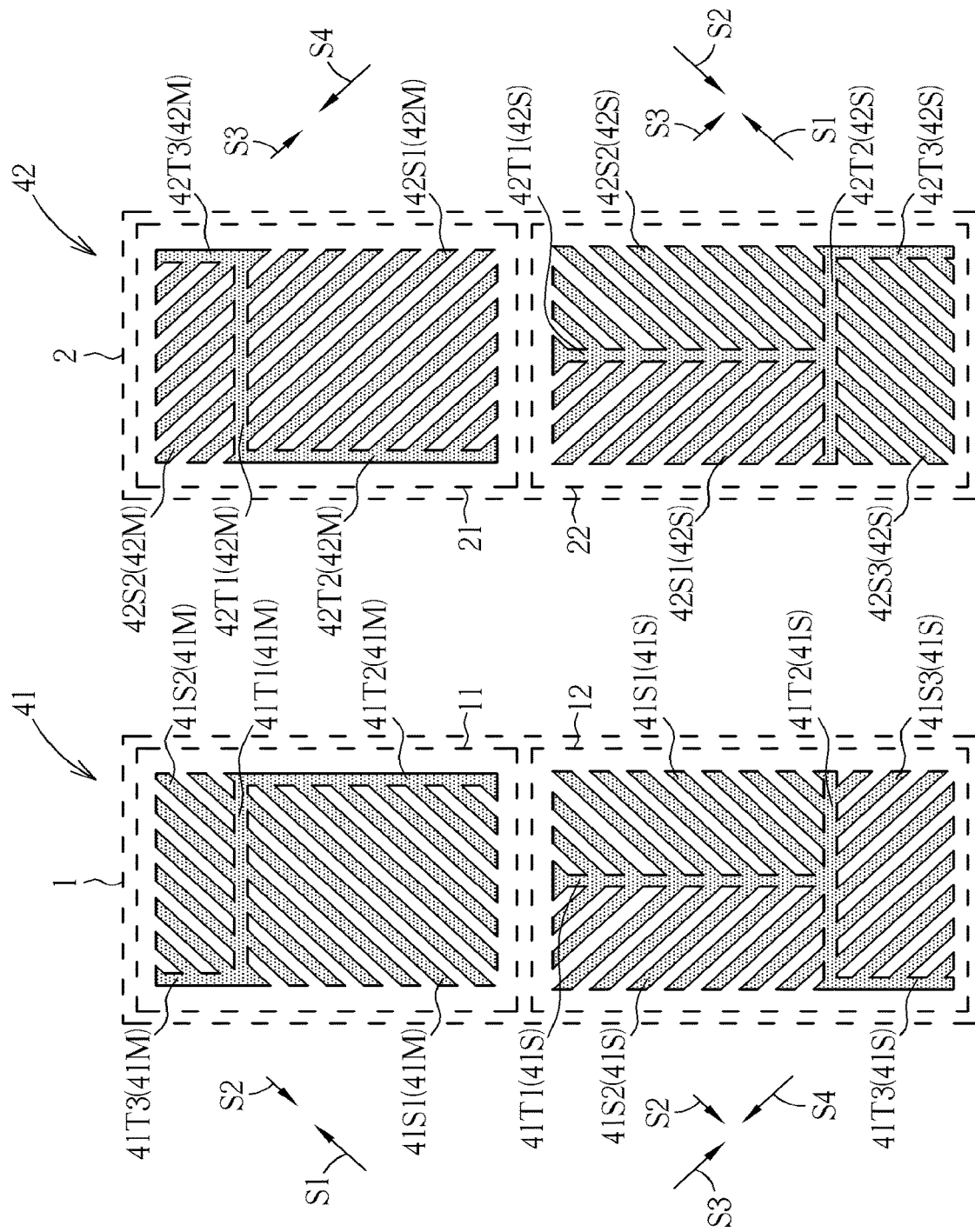
FIG. 9 is a schematic diagram illustrating a first pixel electrode and a second pixel electrode of the liquid crystal display panel according to a variant embodiment of the first preferred embodiment of the present invention.

Please refer to FIG. 9. FIG. 9 is a schematic diagram illustrating a first pixel electrode and a second pixel electrode of the liquid crystal display panel according to a variant embodiment of the first preferred embodiment of the present invention. As shown in FIG. 9, in this variant embodiment, the first pixel electrode 41 and the second pixel electrode 42 are similar to those of FIG. 8, and the difference is that the patterns of the first main pixel electrode 41M, the first sub pixel electrode 41S, the second main pixel electrode 42M and the second sub pixel electrode 42S are slightly modified. Specifically, the first main pixel electrode 41M further includes a third trunk electrode 41T3 and a plurality of second branches 41S2, and the second main pixel electrode 42M further includes a third trunk electrode 42T3 and a plurality of second branches 42S2. In addition, the locations of the first trunk electrode 41T1 of the first sub pixel electrode 41S and the first trunk electrode 42T1 of the second sub pixel electrode 42S are slightly modified while the ratio of the liquid crystal molecules tilted in different directions in the wide viewing mode will be substantially the same. The operation of the first pixel electrodes 41 and the second pixel electrodes 42 in the wide viewing mode and the narrow viewing mode are similar to that of the aforementioned embodiment, and thus will not be redundantly described.

Figure 10:
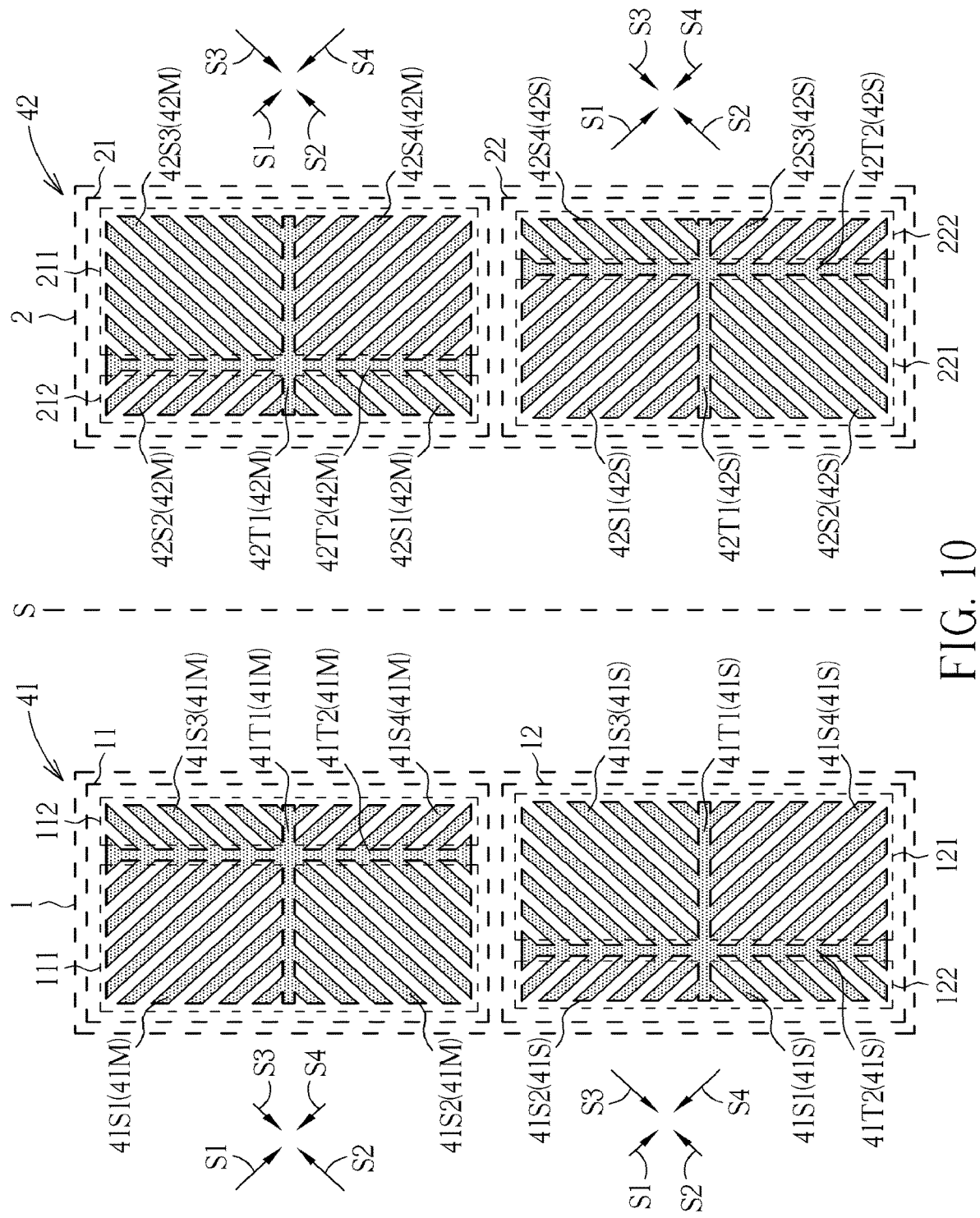
FIG. 10 is a schematic diagram illustrating a first pixel electrode and a second pixel electrode of the liquid crystal display panel according to a second preferred embodiment of the present invention.

Please refer to FIG. 10. FIG. 10 is a schematic diagram illustrating a first pixel electrode and a second pixel electrode of the liquid crystal display panel according to a second preferred embodiment of the present invention. As shown in FIG. 10, the first pixel electrode 41 is disposed in a first region 1, and the first pixel electrode 41 includes a first main pixel electrode 41M disposed on a first main region 11 of the first region 1, and a first sub pixel electrode 41S disposed in a first sub region 12 of the first region 1. The first main pixel electrode 41M includes a first trunk electrode 41T1, a second trunk electrode 41T2, a plurality of first branches 41S1, a plurality of second branches 41S2, a plurality of third branches 41S3 and a plurality of fourth branches 41S4. The first branches 41S1, the second branches 41S2, the third branches 41S3 and the fourth branches 41S4 of the first main pixel electrode 41M are electrically connected to one of the first trunk electrode 41T1 and the second trunk electrode 41T2. The first trunk electrode 41T1 and the second trunk electrode 41T2 of the first main pixel electrode 41M are intersected, forming an asymmetric cross shaped electrode. That is to say, if an equal point (not shown) divides the first trunk electrode 41T1 into two pieces with identical length, the intersection point of the second trunk electrode 41T2 and the first trunk electrode 41T1 are not located at the equal point. The first branches 41S1 of the first main pixel electrode 41M are substantially arranged in parallel along a first direction S1, the second branches 41S2 of the first main pixel electrode 41M are substantially arranged in parallel along a second direction S2, the third branches 41S3 of the first main pixel electrode 41M are substantially arranged in parallel along a third direction S3, and the fourth branches 41S4 of the first main pixel electrode 41M are substantially arranged in parallel along a fourth direction S4. The first sub pixel electrode 41S includes a first trunk electrode 41T1, a second trunk electrode 41T2, a plurality of first branches 41S1, a plurality of second branches 41S2, a plurality of third branches 41S3 and a plurality of fourth branches 41S4. The first branches 41S1, the second branches 41S2, the third branches 41S3 and the fourth branches 41S4 of the first sub pixel electrode 41S are electrically connected to one of the first trunk electrode 41T1 and the second trunk electrode 41T2. The first trunk electrode 41T1 and the second trunk electrode 41T2 of the first sub pixel electrode 41S are intersected, forming an asymmetric cross shaped electrode. That is to say, if an equal point (not shown) divides the first trunk electrode 41T1 into two pieces with identical length, the intersection point of the second trunk electrode 41T2 and the first trunk electrode 41T1 are not located at the equal point. The first branches 41S1 of the first sub pixel electrode 41S are substantially arranged in parallel along the second direction S2, the second branches 41S2 of the first sub pixel electrode 41S are substantially arranged in parallel along the first direction S1, the third branches 41S3 of the first sub pixel electrode 41S are substantially arranged in parallel along the third direction S3, and the fourth branches 41S4 of the first sub pixel electrode 41S are substantially arranged in parallel along the fourth direction S4. The second pixel electrode 42 is disposed in a second region 2, and the second pixel electrode 42 includes a second main pixel electrode 42M disposed on a second main region 21 of the second region 2, and a second sub pixel electrode 42S disposed in a second sub region 22 of the second region 2. The second main pixel electrode 42M includes a first trunk electrode 42T1, a second trunk electrode 42T2, a plurality of first branches 42S1, a plurality of second branches 42S2, a plurality of third branches 42S3 and a plurality of fourth branches 42S4. The first branches 42S1, the second branches 42S2, the third branches 42S3 and the fourth branches 42S4 of the second main pixel electrode 42M are electrically connected to one of the first trunk electrode 42T1 and the second trunk electrode 42T2. The first trunk electrode 42T1 and the second trunk electrode 42T2 of the second main pixel electrode 42M are intersected, forming an asymmetric cross shaped electrode. That is to say, if an equal point (not shown) divides the first trunk electrode 42T1 into two pieces with identical length, the intersection point of the second trunk electrode 42T2 and the first trunk electrode 42T1 are not located at the equal point. The first branches 42S1 of the second main pixel electrodes 42M are substantially arranged in parallel along the second direction S2, the second branches 42S2 of the second main pixel electrode 42M are substantially arranged in parallel along the first direction S1, the third branches 42S3 of the second main pixel electrodes 42M are substantially arranged in parallel along the third direction S3, and the fourth branches 42S4 of the second main pixel electrodes 42M are substantially arranged in parallel along the fourth direction S4.

The second sub pixel electrode 42S includes a first trunk electrode 42T1, a second trunk electrode 42T2, a plurality of first branches 42S1, a plurality of second branches 42S2, a plurality of third branches 42S3 and a plurality of fourth branches 42S4. The first branches 42S1, the second branches 42S2, the third branches 42S3 and the fourth branches 42S4 of the second sub pixel electrode 42S are electrically connected to one of the first trunk electrode 42T1 and the second trunk electrode 42T2. The first trunk electrode 42T1 and the second trunk electrode 42T2 of the second sub pixel electrode 42S are intersected, forming an asymmetric cross shaped electrode. That is to say, if an equal point (not shown) divides the first trunk electrode 42T1 into two pieces with identical length, the intersection point of the second trunk electrode 42T2 and the first trunk electrode 42T1 are not located at the equal point. The first branches 42S1 of the second sub pixel electrode 42S are substantially arranged in parallel along the first direction S1, the second branches 42S2 of the second sub pixel electrode 42S are substantially arranged in parallel along the second direction S2, the third branches 42S3 of the second sub pixel electrode 42S are substantially arranged in parallel along the third direction S3, and the fourth branches 42S4 of the second sub pixel electrode 42S are substantially arranged in parallel along the fourth direction S4.

In this embodiment, the first pixel electrode 41 and the second pixel electrode 42 are mirror symmetric with respect to a symmetry axis S. Specifically, the first main pixel electrode 41M of the first pixel electrode 41 and the second main pixel electrode 42M of the second pixel electrode 42 are mirror symmetric with respect to the symmetry axis S, and the first sub pixel electrode 41S of the first pixel electrode 41 and the second sub pixel electrode 42S of the second pixel electrode 42 are mirror symmetric with respect to the symmetry axis S. In addition, the first main pixel electrode 41M and the first sub pixel electrode 41S are mirror symmetric with respect to the symmetry axis S, and the second main pixel electrode 41S and the second sub pixel electrode 42S are mirror symmetric with respect to the symmetry axis S. With the above design of pixel electrode, in the wide viewing mode, the first main region 11 and the first sub region 12 of the first region 1 and the second main region 21 and the second sub region 22 of the second region 2 can be controlled to be all turned on, and the ratio of the liquid crystal molecules tilted indifferent directions within the main pixel electrode and the sub pixel electrode will be substantially the same. Consequently, the first regions 1 and the second regions 2 can provide uniform brightness in various viewing directions, thereby fulfilling multi-domain wide viewing effect. In the narrow viewing mode, the first sub region 12 of the first region 1 and the second sub region 22 of the second region 2 can be controlled to be turned off, while the first main region 11 of the first region 1 and the second main region 21 of the second region 2 can be controlled to be turned on. Consequently, the anti-peeping effect can be fulfilled.

In addition, in this embodiment, the second trunk electrode 41T2 of at least one first main pixel electrode 41M divides the first main region 11 into a first sub area 111 and a second sub area 112. The area of the first sub area 111 and that of the second sub area 112 of the first main region 11 are unequal. Preferably, the ratio of the area of the first sub area 111 to that of the second sub area 112 of the first main region 11 is substantially greater than or equal to 3:1 and less than substantially 10:0, but not limited thereto. The second trunk electrode 42T2 of at least one second main pixel electrode 21 divides the second main region 21 into a first sub area 211 and a second sub area 212. The area of the first sub area 211 and that of the second sub area 212 of the second main region 21 are unequal. Preferably, the ratio of the area of the first sub area 211 to that of the second sub area 212 of the second main region 21 is substantially greater than or equal to 3:1 and less than 10:0, but not limited thereto. The second trunk electrode 41T2 of at least one first sub pixel electrode 41S divides the first sub region 12 into a first sub area 121 and a second sub area 122. The area of the first sub area 121 and that of the second sub area 122 of the first sub region 12 are unequal. Preferably, the ratio of the area of the first sub area 121 to that of the second sub area 122 of the first sub region 12 is substantially greater than or equal to 3:1 and substantially less than 10:0, but not limited thereto. The second trunk electrode 42T2 of at least one second sub pixel electrodes 42S divides the second sub region 22 into a first sub area 221 and a second sub area 222. The area of the first sub area 221 and that of the second sub area 222 of the second sub region 22 are unequal. Preferably, the ratio of the area of the first sub area 221 to that of the second sub area 222 of the second sub region 22 is substantially greater than or equal to 3:1 and substantially less than 10:0, but not limited thereto. Further, the first direction S1 is along an angle such as about 130 degrees to 140 degrees, specially about 135 degrees, the third direction S3 is along an angle such as about 40 degrees to 50 degrees, specially about 45 degrees, the second direction S2 is along an angle such as about 220 degrees to 230 degrees, specially about 225 degrees, and the fourth direction is along an angle such as about 310 degrees to 320 degrees, specially about 315 degrees, but not limited it.

Please refer to Table 1. Table 1 lists simulation results of the ratio of brightness received by two eyes of a viewer in a front viewing direction and in a side viewing direction under different first sub area-to-second sub area ratio in a narrow viewing mode. It is to be appreciated that a normal direction of the display surface of the liquid crystal display panel is defined as a direction when the viewing direction of the viewer and the display surface are perpendicular, i.e. the azimuth angle is zero. Here, the front viewing direction is defined as a direction when the polar angle (i.e. the included angle) between the viewing direction and the normal direction is approximately 5 degrees, and the side viewing direction is defined as a direction when the polar angle (i.e. the included angle) between the viewing direction and the normal direction is approximately 45 degrees.

TABLE 1

| | First sub area-to-second sub area ratio | | | | |
|---|---|---|---|---|---|
| | 1.5:1 | 3:1 | 5.3:1 | 7:1 | 10:0 |
| Brightness ratio in front viewing direction | 1.066 | 1.172 | 1.243 | 1.270 | 1.377 |
| Brightness ratio in side viewing direction | 1.487 | 2.920 | 5.034 | 6.537 | 87.346 |

As shown in Table 1, when the area ratio of the first sub area to the second sub area is approximately 5.3:1, the brightness ratio received by two eyes of the viewer in the front viewing direction is approximately 1.243 (i.e. the brightness difference between two eyes is approximately 24.3%). This is an acceptable brightness difference because the viewer can clearly distinguish the displayed images. However, the brightness ratio received by two eyes of the viewer in the side viewing direction is approximately 5.034 (i.e. the brightness difference between two eyes is approximately 403.4%). This brightness difference makes it impossible for the viewer to distinguish the displayed images, and thus the anti-peeping effect can be achieved. When the area ratio of the first sub area to the second sub area diminishes, the brightness ratio received by two eyes of the viewer in the front viewing direction will reduces, which means the viewer can distinguish the displayed images more clearly. However, the brightness ratio received by two eyes of the viewer in the side viewing direction will reduces as well, which means the anti-peeping effect will be adversely affected. For example, when the area ratio of the first sub area to the second sub area is approximately 3:1, the brightness ratio received by two eyes of the viewer in the front viewing direction is approximately 1.172, while the brightness ratio received by two eyes of the viewer in the side viewing direction is approximately 2.920; when the area ratio of the first sub area to the second sub area is approximately 1.5:1, the brightness ratio received by two eyes of the viewer in the front viewing direction is approximately 1.066, while the brightness ratio received by two eyes of the viewer in the side viewing direction is approximately 1.487. In addition, when the area ratio of the first sub area to the second sub area increases, the brightness ratio received by two eyes of the viewer in the side viewing direction will increases, which means the anti-peeping effect can be improved, but the brightness ratio received by two eyes of the viewer in the front viewing direction will increases as well, which means it is difficult for the viewer to distinguish the displayed images clearly. For example, when the area ratio of the first sub area to the second sub area is approximately 7:1, the brightness ratio received by two eyes of the viewer in the front viewing direction is approximately 1.270, while the brightness ratio received by two eyes of the viewer in the side viewing direction is approximately 6.537; when the area ratio of the first sub area to the second sub area is approximately 10:0 (which means no second sub area exists as shown in the pixel design of FIG. 11), the brightness ratio received by two eyes of the viewer in the front viewing direction is approximately 1.377, while the brightness ratio received by two eyes of the viewer in the side viewing direction is approximately 87.346. It is appreciated that the ratio of the area of the first sub area to that of the second sub area can be a trade-off between the front viewing effect and the anti-peeping effect, and not limited to the range disclosed in this embodiment. Furthermore, in the first main region, the second main region, the first sub region and the second sub region, the ratio of the area of the first sub area to that of the second sub area has not to be equal, but can be modified individually.

Figure 11:
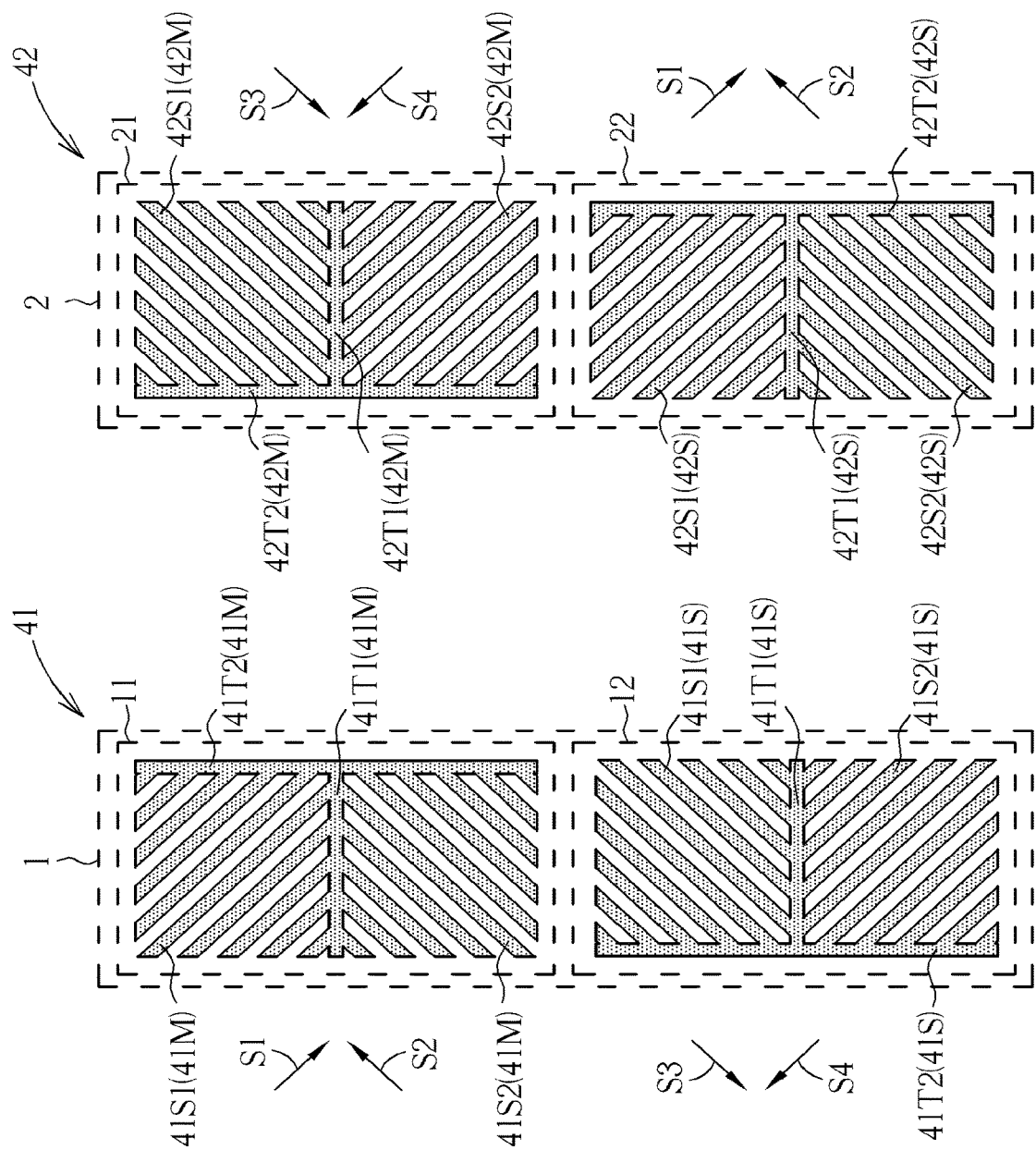
FIG. 11 is a schematic diagram illustrating a first pixel electrode and a second pixel electrode of the liquid crystal display panel according to a variant embodiment of the second preferred embodiment of the present invention.

Please refer to FIG. 11. FIG. 11 is a schematic diagram illustrating a first pixel electrode and a second pixel electrode of the liquid crystal display panel according to a variant embodiment of the second preferred embodiment of the present invention. As shown in FIG. 11, the pattern of the first pixel electrode 41 and the second pixel electrode 42 in this variant embodiment is similar to those of FIG. 10, and the difference is that the first main pixel electrode 41M only includes the first branches 41S1 and the second branches 41S2 arranged along two different directions, the first sub pixel electrode 41S only includes the first branches 41S1 and the second branches 41S2 arranged along two different directions, the second main pixel electrode 42M only includes the first branches 42S1 and the second branches 42S2 arranged along two different directions, and the second sub pixel electrode 42S only includes the first branches 42S1 and the second branches 42S2 arranged along two different directions. In other words, one end of the first trunk electrode 41T1, 42T1 is connected to one side of the second trunk electrode 42T1, 42T2, but does not substantially protrude out from the other side of the second trunk electrode 42T1, 42T2. The operation of the first pixel electrodes 41 and the second pixel electrodes 42 in the wide viewing mode and the narrow viewing mode are similar to that of the aforementioned embodiment, and thus will not be redundantly described.

It is noted that in the embodiments of FIG. 8-FIG. 11, the branches of the first pixel electrode 41 and the second pixel electrode 42 are arranged obliquely, for instance, the azimuth angle of these branches are about 45 degrees, about 135 degrees, about 225 degrees or about 315 degrees, but not limited it. In such a case, the light absorption axes (polarizing axes) of two polarizers of the liquid crystal display panel are preferably about 0 degrees and about 90 degrees, respectively.

Figure 12:
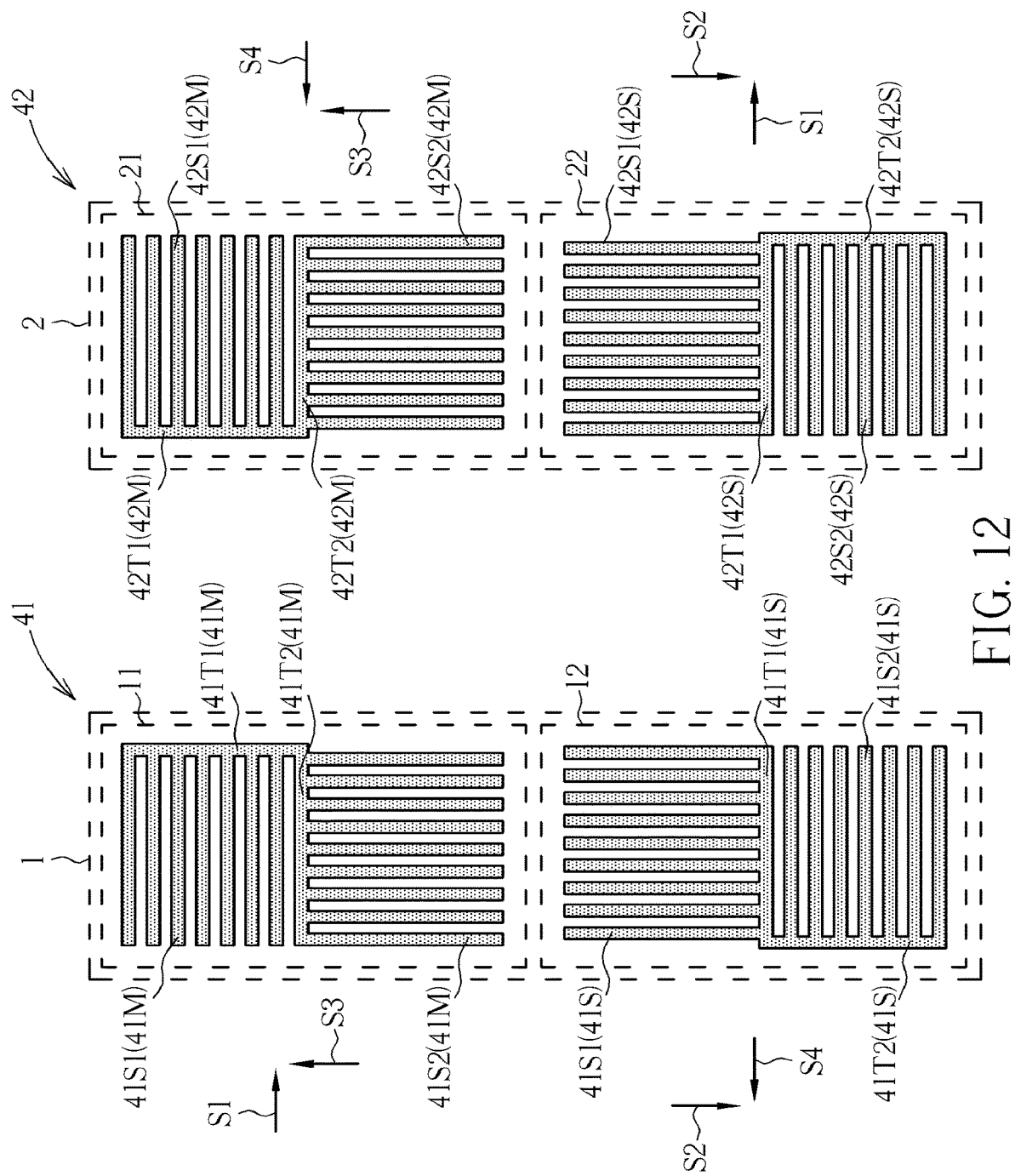
FIG. 12 is a schematic diagram illustrating a first pixel electrode and a second pixel electrode of the liquid crystal display panel according to a third preferred embodiment of the present invention.

Please refer to FIG. 12. FIG. 12 is a schematic diagram illustrating a first pixel electrode and a second pixel electrode of the liquid crystal display panel according to a third preferred embodiment of the present invention. As shown in FIG. 12, the first pixel electrode 41 is disposed in a first region 1, and the first pixel electrode 41 includes a first main pixel electrode 41M disposed on a first main region 11 of the first region 1, and a first sub pixel electrode 41S disposed in a first sub region 12 of the first region 1. The first main pixel electrode 41M includes a first trunk electrode 41T1, a second trunk electrode 41T2, a plurality of first branches 41S1 and a plurality of second branches 41S2. The first trunk electrode 41T1 and the second trunk electrode 41T2 of the first main pixel electrode 41M are electrically connected to each other and substantially arranged perpendicularly. Specifically, one end of the first trunk electrode 41T1 and one end of the second trunk electrode 41T2 of the first main pixel electrode 41M are electrically connected together, substantially forming an L-shaped electrode or L-shaped like. The first branches 41S1 of the first main pixel electrode 41M are electrically connected to the first trunk electrode 41T1, and the first branches 41S1 are arranged in substantially parallel along a first direction S1. The second branches 41S2 of the first main pixel electrode 41M are electrically connected to the second trunk electrode 41T2, and the second branches 41S2 are substantially arranged in parallel along a third direction S3. The first sub pixel electrode 41S includes a first trunk electrode 41T1, a second trunk electrode 41T2, a plurality of first branches 41S1 and a plurality of second branches 41S2. The first trunk electrode 41T1 and the second trunk electrode 41T2 of the first sub pixel electrode 41S are electrically connected to each other and substantially arranged perpendicularly. Specifically, one end of the first trunk electrode 41T1 and one end of the second trunk electrode 41T2 of the first sub pixel electrode 41S are electrically connected together, substantially forming an L-shaped electrode or L-shaped like. The first branches 41S1 of the first sub pixel electrode 41S are electrically connected to the first trunk electrode 41T1, and the first branches 41S1 are substantially arranged in parallel along a second direction S2. The second branches 41S2 of the first sub pixel electrode 41S are electrically connected to the second trunk electrode 41T2, and the second branches 41S2 are substantially arranged in parallel along a fourth direction S4. The second pixel electrode 42 includes a second main pixel electrode 42M disposed on a second main region 21 of the second region 2, and a second sub pixel electrode 42S disposed in a second sub region 22 of the second region 2. The second main pixel electrode 42M includes a first trunk electrode 42T1, a second trunk electrode 42T2, a plurality of first branches 42S1 and a plurality of second branches 42S2. The first trunk electrode 42T1 and the second trunk electrode 42T2 of the second main pixel electrode 42M are electrically connected to each other and substantially arranged perpendicularly. Specifically, one end of the first trunk electrode 42T1 and one end of the second trunk electrode 42T2 of the second main pixel electrode 42M are electrically connected together, substantially forming an L-shaped electrode or L-shaped like. The first branches 42S1 of the second main pixel electrode 42M are electrically connected to the first trunk electrode 42T1, and the first branches 42S1 are arranged in parallel along a fourth direction S4. The second branches 42S2 of the second main pixel electrode 42M are electrically connected to the second trunk electrode 42T2, and the second branches 42S2 are arranged in parallel along a third direction S3. The second sub pixel electrode 42S includes a first trunk electrode 42T1, a second trunk electrode 42T2, a plurality of first branches 42S1 and a plurality of second branches 42S2. The first trunk electrode 42T1 and the second trunk electrode 42T2 of the second sub pixel electrode 42S are electrically connected to each other and substantially arranged perpendicularly. Specifically, one end of the first trunk electrode 42T1 and one end of the second trunk electrode 42T2 of the second sub pixel electrode 42S are electrically connected together, substantially forming an L-shaped electrode or L-shaped like. The first branches 42S1 of the second sub pixel electrode 42S are electrically connected to the first trunk electrode 42T1, and the first branches 42S1 are substantially arranged in parallel along a second direction S2. The second branches 42S2 of the second sub pixel electrode 42S are electrically connected to the second trunk electrode 42T2, and the second branches 42S2 are substantially arranged in parallel along a first direction S1. With the above design of pixel electrode, in the wide viewing mode, the first main region 11 and the first sub region 12 of the first region 1 and the second main region 21 and the second sub region 22 of the second region 2 can be controlled to be all turned on, and the ratio of the liquid crystal molecules tilted in different directions within the main pixel electrode and the sub pixel electrode will be substantially the same. Consequently, the first regions 1 and the second regions 2 can provide uniform brightness in various viewing directions, thereby fulfilling multi-domain wide viewing effect. In the narrow viewing mode, the first sub region 12 of the first region 1 and the second sub region 22 of the second region 2 can be controlled to be turned off, while the first main region 11 of the first region 1 and the second main region 21 of the second region 2 can be controlled to be turned on. Consequently, the anti-peeping effect can be fulfilled.

It is noted that in the embodiment of FIG. 12, the branches of the first pixel electrode 41 and the second pixel electrode 42 are substantially arranged in the vertical direction or in the horizontal direction, for instance, the azimuth angle of these branches are about −5 degree to 5 degree, specially about 0 degree, about 85 degree to 95 degree, specially about 90 degrees, about 175 degree to 185 degree, specially about 180 degrees, or about 265 degree to 275 degree, specially about 270 degrees, but not limited it. In such a case, the light absorption axes (polarizing axes) of two polarizers of the liquid crystal display panel are preferably about 45 degrees (or about 225 degrees) and about 135 degrees (or about 315 degrees), respectively.

The first main pixel electrode 41M and the second main pixel electrode 42M, and the first sub pixel electrode 41S and the second sub pixel electrode 42S are not limited to be mirror symmetric, and can be any electrode pattern that makes the first region 1 and the second region 2 have different light emitting directions in the narrow viewing mode. In addition, the first main pixel electrode 41M and the second main pixel electrode 42M can together form a pixel electrode of a sub pixel, and the first sub pixel electrode 41S and the second sub pixel electrode 42S can together form a pixel electrode of a sub pixel. Alternatively, each of the first main pixel electrode 41M, the second main pixel electrode 42M, the first sub pixel electrode 41S and the second sub pixel electrode 42S can be a pixel electrode of different sub pixels.

Figure 13:
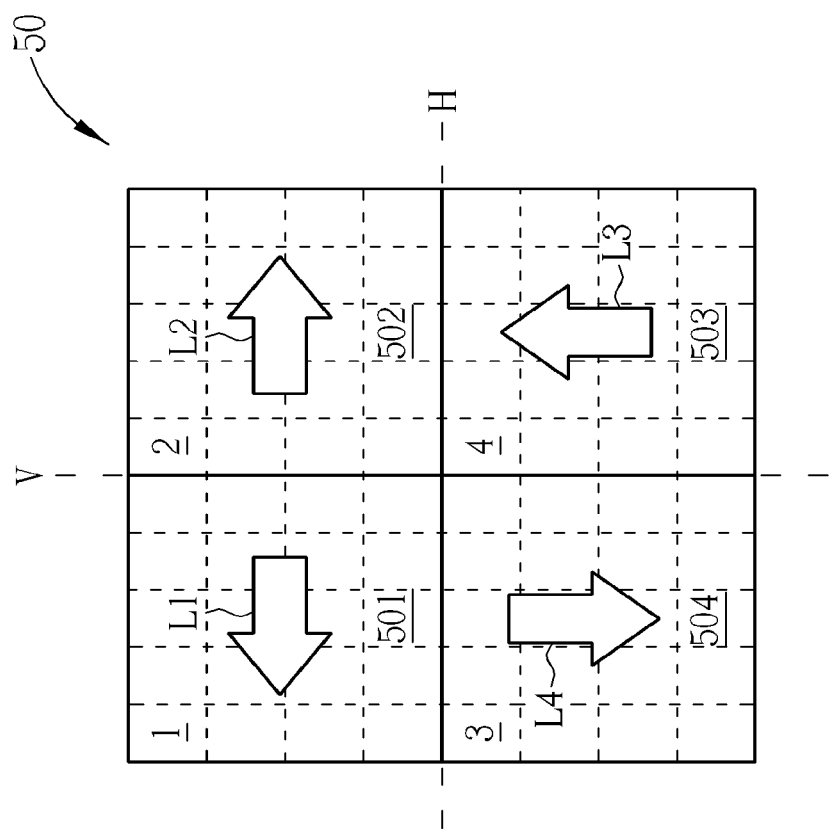
FIG. 13 is a schematic diagram illustrating a liquid crystal display panel according to still another embodiment of the present invention.
Figure 14:
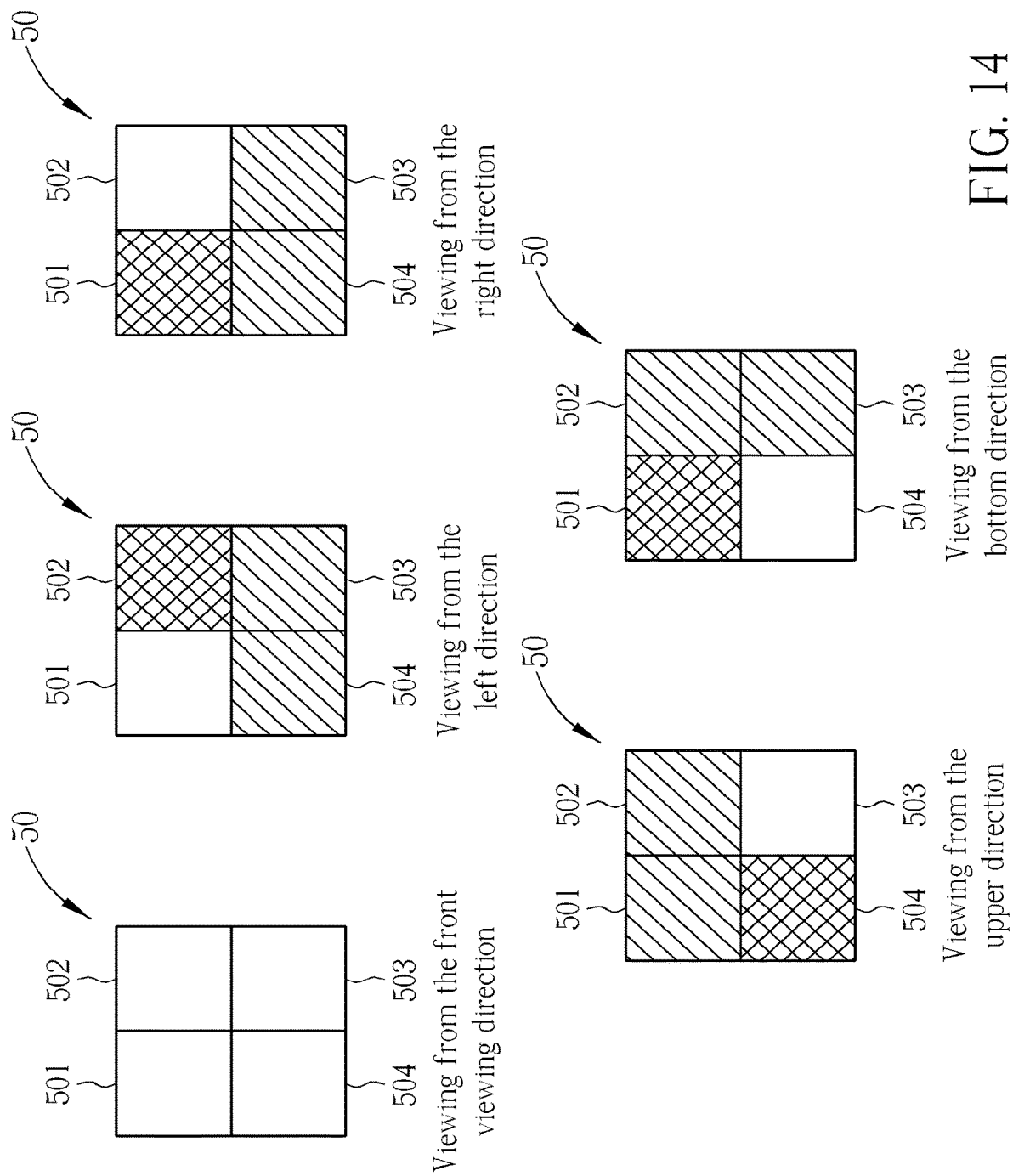
FIG. 14 is a schematic diagram illustrating the liquid crystal display panel when viewed in a front viewing direction and different side viewing directions.

The liquid crystal display panel of the present invention is not limited to be a viewing angle switchable liquid crystal display panel, and can be a liquid crystal display panel with permanent anti-peeping effect. Please refer to FIG. 13 and FIG. 14. FIG. 13 is a schematic diagram illustrating a liquid crystal display panel according to still another embodiment of the present invention, and FIG. 14 is a schematic diagram illustrating the liquid crystal display panel when viewed in a front viewing direction and different side viewing directions. As shown in FIG. 13, the liquid crystal display panel may be divided into a plurality of domains. For example, the liquid crystal display panel 50 may be defined to include a first domain 501, a second domain 502, a third domain 503 and a forth domain 504 by a vertical base line V and a horizontal base line H, but not limited thereto. The first domain 501 includes a plurality of first regions 1, the second domain 502 includes a plurality of second regions 2, the third domain 503 includes a plurality of third regions 3, and the fourth domain 504 includes a plurality of fourth regions 4. The first region 1, the second region 2, the third region 3 and the fourth region 4 substantially have different designs of pixel electrode as described previously. Consequently, at least two of the first domain 501, the second domain 502, the third domain 503 and the fourth domain 504 have different light emitting directions when displaying. In this embodiment, the luminous flux of the first region 1 along the first viewing direction is substantially different from the luminous flux of the first region 1 along a second viewing direction, a third viewing direction and a fourth viewing direction different from the first direction. The luminous flux of the second region 2 along the second viewing direction is substantially different from the luminous flux of the second region 2 along the first viewing direction, the third viewing direction and the fourth viewing direction different from the second direction. The luminous flux of the third region 3 along the third viewing direction is substantially different from the luminous flux of the third region 3 along the first viewing direction, the second viewing direction and the fourth viewing direction different from the third direction. The luminous flux of the fourth region 4 along the fourth viewing direction is substantially different from the luminous flux of the fourth region 4 along the first viewing direction, the second viewing direction and the third viewing direction different from the fourth direction. In addition, the luminous flux of the first region 1 along the first viewing direction is substantially different from the luminous flux of the second region 2, the third region 3 and the fourth region 4 along the first viewing direction. The luminous flux of the second region 2 along the second viewing direction is substantially different from the luminous flux of the first region 1, the third region 3 and the fourth region 4 along the second viewing direction. The luminous flux of the third region 3 along the third viewing direction is substantially different from the luminous flux of the first region 1, the second region 2 and the fourth region 4 along the third viewing direction. The luminous flux of the fourth region 4 along the fourth viewing direction is substantially different from the luminous flux of the first region 1, the second region 2 and the third region 3 along the fourth viewing direction. For example, the first domain 501 may have a first light emitting direction L1 (left side in FIG. 13), the second domain 502 may have a second light emitting direction L2 (right side in FIG. 13), the third domain 503 may have a third light emitting direction L3 (upper side in FIG. 13), and the fourth domain 504 may have a fourth light emitting direction L4 (bottom side in FIG. 13). The light emitting direction means the luminous flux in this direction is substantially larger than the luminous flux in other directions. For instance, the luminous flux of the first domain 501 in the first light emitting direction L1 is substantially larger than that in other directions, the luminous flux of the second domain 502 in the second light emitting direction L2 is substantially larger than that in other directions, the luminous flux of the third domain 503 in the third light emitting direction L3 is substantially larger than that in other directions, and the luminous flux of the fourth domain 504 in the fourth light emitting direction L4 is substantially larger than that in other directions. Making different domains have different light emitting directions can be achieved for example by the design of pixel electrode pattern in the aforementioned embodiments, and are not redundantly described. As shown in FIG. 14, whining viewing from the front viewing direction, the first domain 501, the second domain 502, the third domain 503 and the fourth domain 504 can all provide brightness, therefore the liquid crystal display panel 50 can display normally. When viewing from the left direction, the first domain 501 can emit sufficient luminous flux along the first light emitting direction L1, and therefore can provide normal brightness. The other domains except for the first domain 501 cannot emit sufficient luminous flux along the first light emitting direction L1, and thus the brightness of the other domains is significantly less than the brightness of the first domain 501 when viewing from the left direction. In addition, the second light emitting direction L2 of the second domain 502 is completely opposite to the first light emitting direction L1 (the included angle between the first light emitting direction L1 and the second light emitting direction L2 is approximately 180 degrees), and thus when viewing from the left direction, the second domain 502 will have the lowest brightness. The third light emitting direction L3 of the third domain 503 and the fourth light emitting direction L4 of the fourth domain 504 are different from but not completely opposite to the first light emitting direction L1 (the included angle between the first light emitting direction L1 and the third light emitting direction L3 is approximately 90 degrees, and the included angle between the first light emitting direction L1 and the fourth light emitting direction L4 is approximately 90 degrees), and therefore the brightness of the third domain 503 and the fourth domain 504 is substantially lower than the brightness of the first domain 501, but substantially higher than the brightness of the second domain 502. Similarly, when viewing from the right direction, the second domain 502 can emit sufficient luminous flux along the second light emitting direction L2, and therefore can provide normal brightness. The other domains except for the second domain 502 cannot emit sufficient luminous flux along the second light emitting direction L2. Thus, the first domain 501 has the lowest brightness, and the brightness of the third domain 503 and the fourth domain 504 is substantially lower than the brightness of the second domain 502, but substantially higher than the brightness of the first domain 501. When viewing from the upper direction, the third domain 503 can emit sufficient luminous flux along the third light emitting direction L3, and therefore can provide normal brightness. The other domains except for the third domain 503 cannot emit sufficient luminous flux along the third light emitting direction L3. Thus, the fourth domain 504 has the lowest brightness, and the brightness of the first domain 501 and the second domain 502 is substantially lower than the brightness of the third domain 503, but substantially higher than the brightness of the fourth domain 504. When viewing from the bottom direction, the fourth domain 504 can emit sufficient luminous flux along the fourth light emitting direction L4, and therefore can provide normal brightness. The other domains except for the fourth domain 504 cannot emit sufficient luminous flux along the fourth light emitting direction L4. Thus, the third domain 503 has the lowest brightness, and the brightness of the first domain 501 and the second domain 502 is substantially lower than the brightness of the fourth domain 504, but substantially higher than the brightness of the third domain 503. As a result, the viewer can only see the displayed images with uniform brightness from the front viewing direction. From any side viewing directions, the viewer can only see interfered images with uneven brightness. Thus, the liquid crystal display panel 50 can provide the anti-peeping effect.

In conclusion, the liquid crystal display panel of the present invention can provide excellent anti-peeping effect by modifying the pattern design of pixel electrode without changing or adding manufacturing process, and the cost and process complexity are not increased. In addition, the liquid crystal display panel of the present invention can be various types of liquid crystal display panels such as transmission type, transflective type, reflective type, vertical alignment (VA) type, in-plane switching (IPS) type, multi-domain vertical alignment (MVA), twisted nematic (TN) type, super twisted nematic (STN), patterned vertical alignment (PVA) type, super patterned vertical alignment (S-PVA) type, advanced super view (ASV) type, fringe field switching (FFS) type, Continuous Pinwheel Alignment (CPA) type, axially symmetric aligned micro-cell (ASM) type, optical compensated bend (OCB) type, super in-plane switching (S-IPS) type, advanced super in-plane switching (AS-IPS) type, ultra fringe field switching (UFFS) type, polymer stabilized liquid crystal (PSLC) type, dual-view type, triple-view type, blue phase type, touch input integrated type, electrophoresis type, electro-wetting type, other types, or a combination thereof.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A liquid crystal display panel, comprising:
   a first substrate;
   a second substrate, disposed oppositely to the first substrate;
   a liquid crystal layer, disposed between the first substrate and the second substrate;
   a plurality of first regions and a plurality of second regions, formed on the first substrate and the second substrate, wherein each of the first regions has a first main region and a first sub region, and each of the second regions has a second main region and a second sub region; and
   a plurality of first pixel electrodes and a plurality of second pixel electrodes, disposed on the first substrate, wherein each of the first pixel electrodes is disposed in each of the first regions, each of the second pixel electrodes is disposed in each of the second regions, each of the first pixel electrodes comprises a first main pixel electrode and a first sub pixel electrode, each of the second pixel electrodes comprises a second main pixel electrode and a second sub pixel electrode, the first main pixel electrode is disposed in the first main region, the first sub pixel electrode is disposed in the first sub region, the second main pixel electrode is disposed in the second main region, and the second sub pixel electrode is disposed in the second sub region;
   wherein each of the first main pixel electrode, each of the second main pixel electrodes, each of the first sub pixel electrodes and each of the second sub pixel electrodes respectively comprises a first trunk electrode, a second trunk electrode and a plurality of first branches, the first trunk electrode and the second trunk electrode of each of the first main pixel electrodes are electrically connected to each other and substantially arranged perpendicularly to form an L-shaped structure, the first branches of each of the first main pixel electrodes are electrically connected to one of the first trunk electrode and the second trunk electrode of each of the first main pixel electrodes, the first branches of each of the first main pixel electrode are substantially arranged in parallel;
   wherein the first trunk electrode and the second trunk electrode of each of the second main pixel electrodes are electrically connected to each other and substantially arranged perpendicularly to form an L-shaped structure, the first branches of each of the second main pixel electrodes are electrically connected to one of the first trunk electrode and the second trunk electrode of each of the second main pixel electrodes, and the first branches of each of the second main pixel electrodes are arranged in parallel;
   wherein each of the first sub pixel electrodes and each of the second sub pixel electrodes further respectively comprises a third trunk electrode, a plurality of second branches and a plurality of third branches, the first trunk electrode and the second trunk electrode of each of the first sub pixel electrodes are electrically connected to each other and substantially arranged perpendicularly to form a T-shaped structure, the second trunk electrode and the third trunk electrode of each of the first sub pixel electrodes are electrically connected to each other and substantially arranged perpendicularly to form an L-shaped structure, the first branches, the second branches and the third branches of each of the first sub pixel electrodes are electrically connected to one of the first trunk electrode, the second trunk electrode and the third trunk electrode of each of the first sub pixel electrodes, the first branches of each of the first sub pixel electrodes are substantially arranged in parallel, the second branches of each of the first sub pixel electrodes are substantially arranged in parallel, the third branches of each of the first sub pixel electrodes are arranged in parallel, the first branches, the second branches and the third branches of each of the first sub pixel electrodes are arranged along different directions; and wherein the first trunk electrode and the second trunk electrode of each of the second sub pixel electrodes are electrically connected to each other and substantially arranged perpendicularly to form a T-shaped structure, the second trunk electrode and the third trunk electrode of each of the second sub pixel electrodes are electrically connected to each other and substantially arranged perpendicularly to form an L-shaped structure, the first branches, the second branches and the third branches of each of the second sub pixel electrodes are electrically connected to one of the first trunk electrode, the second trunk electrode and the third trunk electrode of each of the second sub pixel electrodes, the first branches of each of the second sub pixel electrodes are substantially arranged in parallel, the second branches of each of the second sub pixel electrodes are substantially arranged in parallel, the third branches of each of the second sub pixel electrodes are substantially arranged in parallel, and the first branches, the second branches and the third branches of each of the second sub pixel electrodes are arranged along different directions.

2. The liquid crystal display panel of claim 1, wherein the first branches of each of the first main pixel electrodes and the first branches of each of the second main pixel electrodes are arranged along different directions.

3. The liquid crystal display panel of claim 1, further comprising:
a first domain; and
a second domain, wherein the first domain includes the first regions disposed immediately adjoining to each other, and the second domain includes the second regions disposed immediately adjoining to each other.

4. The liquid crystal display panel of claim 1, wherein the first main pixel electrode and the second main pixel electrode are mirror symmetric with respect to a symmetry axis, and the first sub pixel electrode and the second sub pixel electrode are mirror symmetric with respect to the symmetry axis.

5. A liquid crystal display panel, comprising:
a first substrate;
a second substrate, disposed oppositely to the first substrate;
a liquid crystal layer, disposed between the first substrate and the second substrate;
a plurality of first regions and a plurality of second regions, formed on the first substrate and the second substrate, wherein each of the first regions has a first main region and a first sub region, and each of the second regions has a second main region and a second sub region;
a first domain;
a second domain;
a plurality of first pixel electrodes disposed on the first substrate, wherein each of the first pixel electrodes comprises a first main pixel electrode and a first sub pixel electrode, the first main pixel electrode is disposed in the first main region, and the first sub pixel electrode is disposed in the first sub region; and
a plurality of second pixel electrodes disposed on the first substrate, wherein each of the second pixel electrodes comprises a second main pixel electrode and a second sub pixel electrode, the second main pixel electrode is disposed in the second main region, the second sub pixel electrode is disposed in the second sub region, each of the first pixel electrodes and each of the second pixel electrodes have different electrode patterns, the first domain includes the first regions disposed adjoining to each other, and the second domain includes the second regions disposed adjoining to each other;

wherein each of the first main pixel electrodes, each of the second main pixel electrode, each of the first sub pixel electrodes and each of the second sub pixel electrodes respectively comprises a first trunk electrode, a second trunk electrode, a third trunk electrode, a plurality of first branches and a plurality of second branches, the first trunk electrode and the second trunk electrode of each of the first main pixel electrodes are electrically connected to each other and substantially arranged perpendicularly, the second trunk electrode and the third trunk electrode of each of the first main pixel electrodes are electrically connected to each other and substantially arranged perpendicularly, the first branches and the second branches of each of the first main pixel electrodes are electrically connected to one of the first trunk electrode, the second trunk electrode and the third trunk electrode of each of the first main pixel electrodes, the first branches of each of the first main pixel electrodes are substantially arranged in parallel, the second branches of each of the first main pixel electrodes are substantially arranged in parallel, the first branches and the second branches of each of the first main pixel electrodes are arranged along different directions;

wherein the first trunk electrode and the second trunk electrode of each of the second main pixel electrodes are electrically connected to each other and substantially arranged perpendicularly, the second trunk electrode and the third trunk electrode of each of the second main pixel electrodes are electrically connected to each other and substantially arranged perpendicularly, the first branches and the second branches of each of the second main pixel electrodes are electrically connected to one of the first trunk electrode, the second trunk electrode and the third trunk electrode of each of the second main pixel electrodes, the first branches of each of the second main pixel electrodes are substantially arranged in parallel, the second branches of each of the second main pixel electrodes are substantially arranged in parallel, and the first branches and the second branches of each of the second main pixel electrodes are arranged along different directions;

wherein each of the first sub pixel electrodes and each of the second sub pixel electrodes further respectively comprises a plurality of third branches, the first trunk electrode and the second trunk electrode of each of the first sub pixel electrodes are electrically connected to each other and substantially arranged perpendicularly, the second trunk electrode and the third trunk electrode of each of the first sub pixel electrodes are electrically connected to each other and substantially arranged perpendicularly, the first branches, the second branches and the third branches of each of the first sub pixel electrodes are electrically connected to one of the first trunk electrode, the second trunk electrode and the third trunk electrode of each of the first sub pixel electrodes, the first branches of each of the first sub pixel electrodes are substantially arranged in parallel, the second branches of each of the first sub pixel electrodes are substantially arranged in parallel, the third branches of each of the first sub pixel electrodes are substantially arranged in parallel, the first branches, the second branches and the third branches of each of the first sub pixel electrodes are arranged along different directions;

wherein the first trunk electrode and the second trunk electrode of each of the second sub pixel electrodes are electrically connected to each other and substantially arranged perpendicularly, the second trunk electrode and the third trunk electrode of each of the second sub pixel electrodes are electrically connected to each other and substantially arranged perpendicularly, the first branches, the second branches and the third branches of each of the second sub pixel electrodes are electrically connected to one of the first trunk electrode, the second trunk electrode and the third trunk electrode of each of the second sub pixel electrodes, the first branches of each of the second sub pixel electrodes are substantially arranged in parallel, the second branches of each of the second sub pixel electrodes are substantially arranged in parallel, the third branches of each of the second sub pixel electrodes are substantially arranged in parallel, and the first branches, the second branches and the third branches of each of the second sub pixel electrodes are arranged along different directions;

wherein in at least one of each of the first sub pixel electrode and each of the second sub pixel electrode, the first trunk electrode and the second trunk electrode is connected to each other and substantially arranged perpendicularly to form a T-shaped structure, and one end of the second trunk electrode is connected to the third trunk electrode; and wherein in a narrow viewing mode, the first regions and the second regions have a first viewing direction and a second viewing direction, the first viewing direction is opposite to the second viewing direction, a luminous flux of the first regions along the first viewing direction is different from that of the first regions along the second viewing direction, a luminous flux of the second regions along the first viewing direction is different from that of the first regions along the first viewing direction, the first sub regions of the first domain have substantially no luminous flux, a luminous flux of the first main regions of the first domain along the first viewing direction is different from that of the first main regions of the first domain along the second viewing direction, the second sub regions of the second domain have substantially no luminous flux, a luminous flux of the second main regions of the second domain along second viewing direction is different from that of the second main regions of the second domain along the first viewing direction, the luminous flux of the first main regions along the first viewing direction is different from that of the second main regions along the first viewing direction, and the luminous flux of the first main regions along the second viewing direction is different from that of the second main regions along the second viewing direction.

6. The liquid crystal display panel of claim 5, further comprising a plurality of pixel electrodes, a plurality of third regions and a plurality of fourth regions formed on the first substrate and the second substrate, third domain and a fourth domain, wherein the pixel electrodes disposed in the first region, the second region, the third region and the fourth region having different pixel electrode patterns, wherein the pixel electrodes disposed in the first region, the second region, the third region and the fourth region are electrically connected to a different pixel switching devices, and the third regions are disposed in the third domain, and the fourth regions are disposed in the fourth domain.

* * * * *